(12) United States Patent
Yedidi et al.

(10) Patent No.: US 9,363,513 B2
(45) Date of Patent: Jun. 7, 2016

(54) METHODS, SYSTEMS, AND COMPUTER PROGRAM PRODUCTS FOR ASSESSING A MACROBLOCK CANDIDATE FOR CONVERSION TO A SKIPPED MACROBLOCK

(75) Inventors: Satya N. Yedidi, Roseville, CA (US); Atthar H. Mohammed, Folsom, CA (US); Hong Jiang, El Dorado Hills, CA (US); Ning Lu, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 13/995,184

(22) PCT Filed: Dec. 14, 2011

(86) PCT No.: PCT/US2011/064871
§ 371 (c)(1),
(2), (4) Date: Apr. 18, 2014

(87) PCT Pub. No.: WO2013/089700
PCT Pub. Date: Jun. 20, 2013

(65) Prior Publication Data
US 2014/0219354 A1    Aug. 7, 2014

(51) Int. Cl.
*H04N 19/00* (2014.01)
*H04N 19/583* (2014.01)
(Continued)

(52) U.S. Cl.
CPC ....... *H04N 19/00733* (2013.01); *H04N 19/109* (2014.11); *H04N 19/124* (2014.11); *H04N 19/139* (2014.11); *H04N 19/157* (2014.11); *H04N 19/176* (2014.11); *H04N 19/51* (2014.11)

(58) Field of Classification Search
CPC ................................................ H04N 19/00733
USPC ....................................................... 375/240.16
See application file for complete search history.

(56) References Cited

U.S. PATENT DOCUMENTS

| 5,091,782 | A | 2/1992 | Krause et al. |
| 7,454,071 | B2 * | 11/2008 | Howard ................ H03M 7/40 |
| | | | 375/240.03 |

(Continued)

FOREIGN PATENT DOCUMENTS

| TW | 201008289 | 2/2010 |
| TW | 201143456 | 12/2011 |
| WO | 2013089700 A1 | 6/2013 |

OTHER PUBLICATIONS

International Search Report and Written Opinion received for PCT Patent Application No. PCT/US2011/064871, mailed on Sep. 3, 2012, 9 pages.

(Continued)

*Primary Examiner* — Jeffery Williams
(74) *Attorney, Agent, or Firm* — Green, Howard & Mughal, LLP

(57) ABSTRACT

A sequence of encoded data associated with a block of video is assessed to determine if: quantized coefficients of transformed residual pixel data associated with the block are equal to zero, the block was encoded using a temporal compression process, a slice that includes the block is configured to be encoded using only one reference picture list or two reference picture lists, the block is unpartitioned or was encoded in direct mode, a reference picture used to encode the block is the reference picture associated with a lowest index value on the one reference picture list, and an actual motion vector associated with the block is equal to a predicted motion vector associated with the block.

30 Claims, 16 Drawing Sheets

(51) Int. Cl.
*H04N 19/139* (2014.01)
*H04N 19/176* (2014.01)
*H04N 19/51* (2014.01)
*H04N 19/109* (2014.01)
*H04N 19/124* (2014.01)
*H04N 19/157* (2014.01)

(56) References Cited

U.S. PATENT DOCUMENTS

| | | |
|---|---|---|
| 2004/0028139 A1 | 2/2004 | Zaccarin et al. |
| 2007/0014359 A1* | 1/2007 | Gomila ............... H04N 19/51 375/240.16 |
| 2009/0003441 A1* | 1/2009 | Sekiguchi ............ H04N 19/176 375/240.13 |
| 2010/0189180 A1 | 7/2010 | Narroschke et al. |
| 2013/0148729 A1* | 6/2013 | Sasai ..................... H04N 19/70 375/240.12 |

OTHER PUBLICATIONS

International Preliminary Report on Patentability and Written Opinion received for PCT Patent Application No. PCT/US2011/064871, mailed on Jun. 26, 2014, 6 pages.

Official Letter and Search Report for Taiwan Patent Application No. 101146874 mailed Mar. 21, 2016, 9 pages.

* cited by examiner

METHODS, SYSTEMS, AND COMPUTER PROGRAM PRODUCTS FOR ASSESSING A MACROBLOCK CANDIDATE FOR CONVERSION TO A SKIPPED MACROBLOCK

BACKGROUND

Video is the technology of electronically capturing, recording, processing, storing, transmitting, and reconstructing a sequence of images that collectively represent a scene in motion. The substantial amount of original data needed to represent images in video may tax the capacity of currently available data storage devices. Furthermore, at currently available rates of data transmission, the substantial amount of original data needed to represent images in video may hinder the ability of a receiver to process received original data at a rate sufficiently fast enough to present, contemporaneously, the frames at a rate sufficiently fast enough to produce an illusion of continuity to the human eye.

Video compression processes may reduce the amount of original data needed to represent images in video by identifying instances in which the same or similar values of data are included at different locations in the bitstream and replacing the data in at least some of these locations with binary codes that identify the redundancy. Because the binary codes may use fewer bits than the values of the original data, the number of bits in the bitstream may be reduced.

In order to reduce the number of bits in the bitstream, some technical standards for video compression may provide for default processes to be performed by decoders compliant with the technical standard in the absence of binary codes directing different processes. Sometimes it may be possible to include in the bitstream a binary code that indicates that all other data associated with a block of video have been excluded from the bitstream.

BRIEF DESCRIPTION OF THE DRAWINGS/FIGURES

Figure 1:
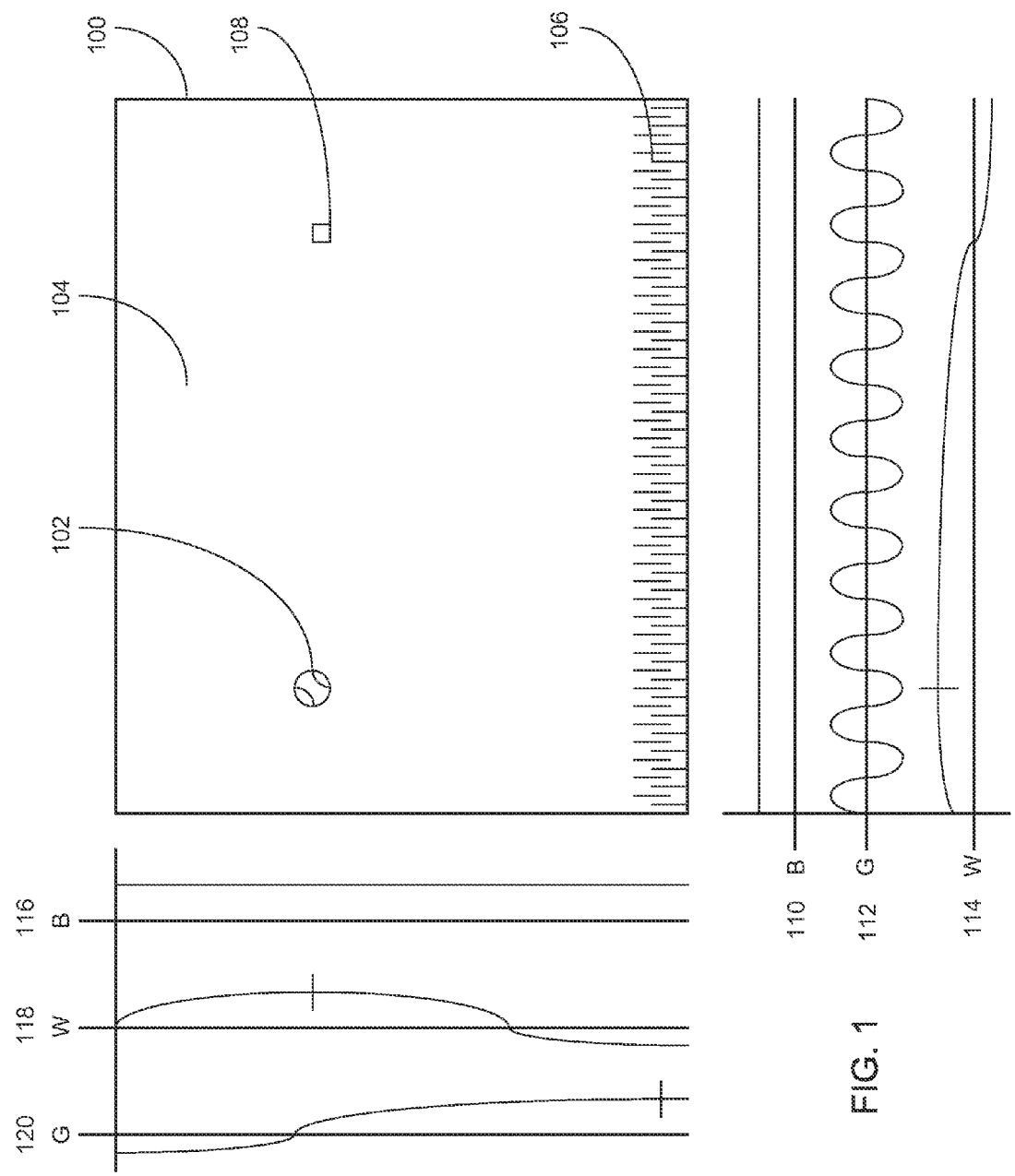
FIG. 1 illustrates an example of a frame of a captured image.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems, and computer program products to assess a block candidate for conversion to a skipped block.

Video is the technology of electronically capturing, recording, processing, storing, transmitting, and reconstructing a sequence of images that collectively represent a scene in motion. A captured image in the sequence may be known as a frame. If the rate at which the frames are presented is sufficiently fast, for example, at least 24 frames per second, then the human eye may perceive an illusion of continuity from the presentation of one frame to the next.

Historically, in the early development of television technology when frame rates were sufficiently slow, a flicker may appear when video was presented. To compensate for this flicker, the frame was divided into two alternate rows of fields, every odd row belonging to a first field and every even row belonging to a second field. Each field could be presented at a faster frame rate and the result may reduce the appearance of the flicker. As video technology has continued to evolve and build upon past designs, fields have remained a part of the technology. However, they are treated in the same manner as frames. Accordingly, processes performed upon frames, as described below, may similarly be performed upon fields and the terms frame and field may be used interchangeably.

FIG. 1 illustrates an example of a frame of a captured image. The captured image shows, for example, a baseball 102 in a sky 104 above a field 106. A frame 100, when captured in a digital form, may be represented by a two dimensional array of picture elements (or pixels). A pixel 108 may be configured to store data representing a sample of the image at a location in the image that corresponds to a location of pixel 108 in the array. The values of the data may be represented using binary digits (or bits). The data may include values that correspond to a degree of brightness of pixel 108. Colors may be realized through combinations of various proportions of basic colors such as, for example, red, green, and blue. To include color in the frame, pixel 108 may be configured to store data at different channels corresponding to the basic colors. The data in the video may be organized into a stream of bits (or bitstream), which may be ordered in a manner so that a properly configured receiver may receive the bitstream and process the data to present the video.

The substantial amount of original data needed to represent images in video may tax the capacity of currently available data storage devices. Furthermore, at currently available rates of data transmission, the substantial amount of original data needed to represent images in video may hinder the ability of a receiver to process received original data at a rate sufficiently fast enough to present, contemporaneously, the frames at a rate sufficiently fast enough to produce an illusion of continuity to the human eye.

Video compression processes may reduce the number of bits needed to represent images in video. A compressor (or encoder) may be used to compress (or encode) the original data to produce compressed (or encoded) data for storage or transmission. A receiver may include a decompressor (or decoder) used to decompress (or decode) the compressed (encoded) data to produce reconstructed data. The values of the reconstructed data should be equal to the values of the original data (lossless compression) or the values of the reconstructed data should be equivalent to the values of the original data (lossy compression).

Lossy video compression may be acceptable in certain situations. First, it may be the case that the differences (or distortion) between the video produced from the reconstructed data and the video produced from the original data are sufficiently small as to be imperceptible to the human eye. Second, it may be the case that the differences between the video produced from the reconstructed data and the video produced from the original data are not sufficiently small as to be imperceptible to the human eye, but nevertheless acceptable because the video compression may reduce the number of bits in the bitstream by an amount sufficient enough to allow the encoded data to be: (1) stored on a given data storage device or (2) transmitted at a rate sufficiently fast enough that a receiver may contemporaneously process the encoded data, may produce the reconstructed data, and may present the frames at a rate sufficiently fast enough to produce an illusion of continuity to the human eye. This second case may be thought of as a tradeoff that favors, for example, a real-time rate of presentation of a video at the expense of the fidelity of the images represented in the video.

Video compression processes may reduce the amount of original data needed to represent images in video by identifying instances in which the same or similar values of data are included at different locations in the bitstream and replacing the data in at least some of these locations with binary codes that identify the redundancy. Because the binary codes user fewer bits than the values of the original data, the number of bits in the bitstream may be reduced.

In order for recorders, transmitters, receivers, and other video machines to be able to interact so that they may properly produce bitstreams, process bitstreams, or both, the video industry has developed technical standards to establish certain configuration requirements. Among these technical standards is, for example, Advanced Video Coding (ITU-T Recommendation H.264 (ISO/IEC 14496 (MPEG-4) Part 10)) (or the Advanced Video Coding standard). In addition to other concerns, the Advanced Video Coding standard prescribes a format for ordering data and binary codes in a bitstream so that the bitstream may be properly processed by a receiver compliant with the standard.

Figure 2:
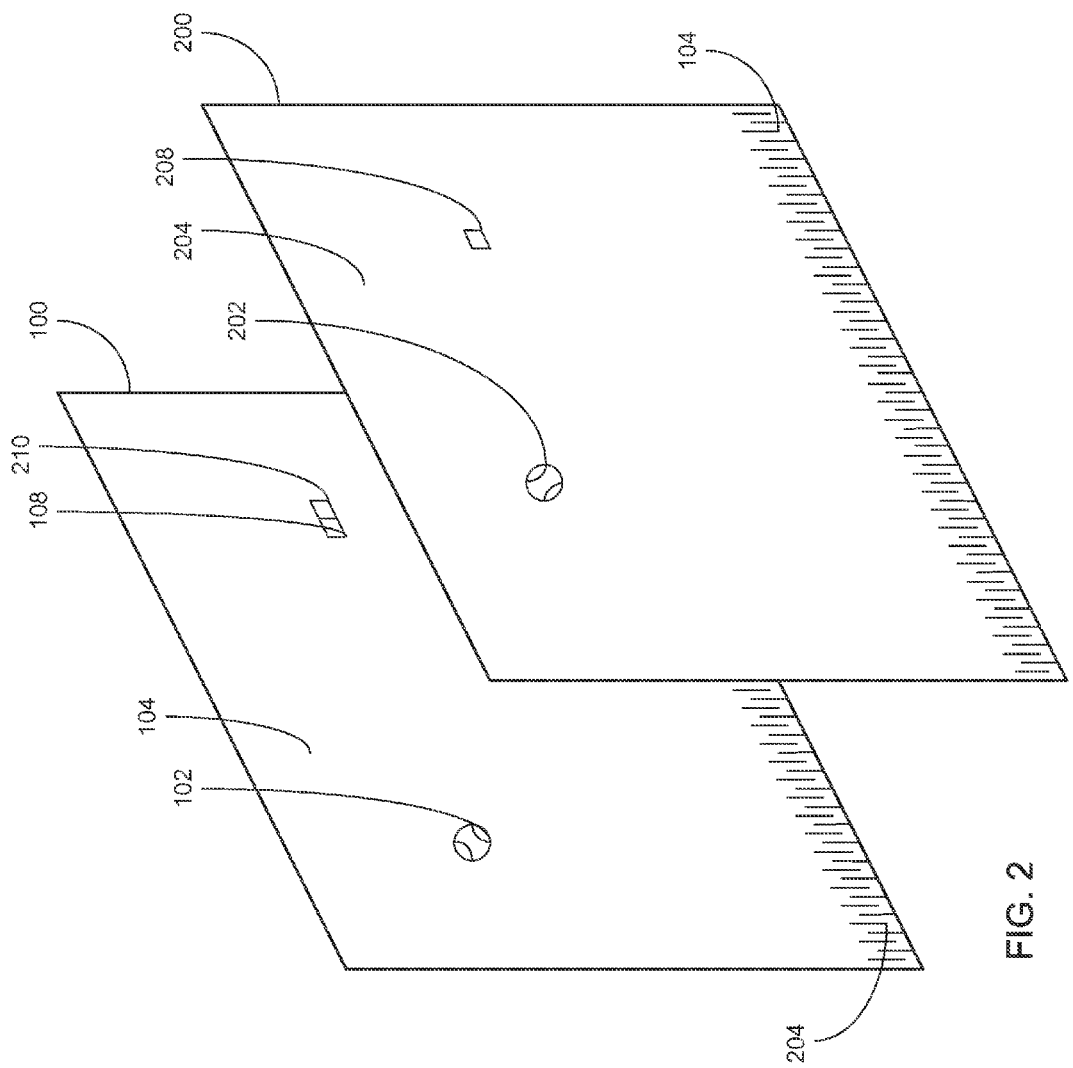
FIG. 2 illustrates an example of two consecutive frames in a sequence.

FIG. 2 illustrates an example of two consecutive frames in a sequence. Earlier frame 100 includes, for example, baseball 102 in sky 104 above field 106. A later frame 200 includes, for example, a baseball 202 in a sky 204 above a field 206. Pixel 108 in frame 100 may correspond to a pixel 208 in frame 200. Because it may be the case that the value of the original data stored in pixel 108 is the same as or similar to the value of the original data stored in pixel 208, it may be possible to replace, in the bitstream, the values of the original data of pixels 108 and 208 with a binary code that uses fewer bits (temporal compression). This may likely be the case when data stored in pixels 108 and 208 represent stationary objects in the images (e.g., skies 104 and 204 and fields 106 and 206). Similarly, because it may be the case that the value of the original data stored in pixel 108 is the same as or similar to the value of the original data stored in a pixel 210 of frame 100, it may be possible to replace, in the bitstream, the values of the original data of pixels 108 and 210 with a binary code that uses fewer bits (spatial compression). This may likely be the case when data stored in pixels 108 and 208 represent a homogenous object in the image (e.g., sky 104 and field 106). These approaches represent underlying principles of video compression.

Figure 3:
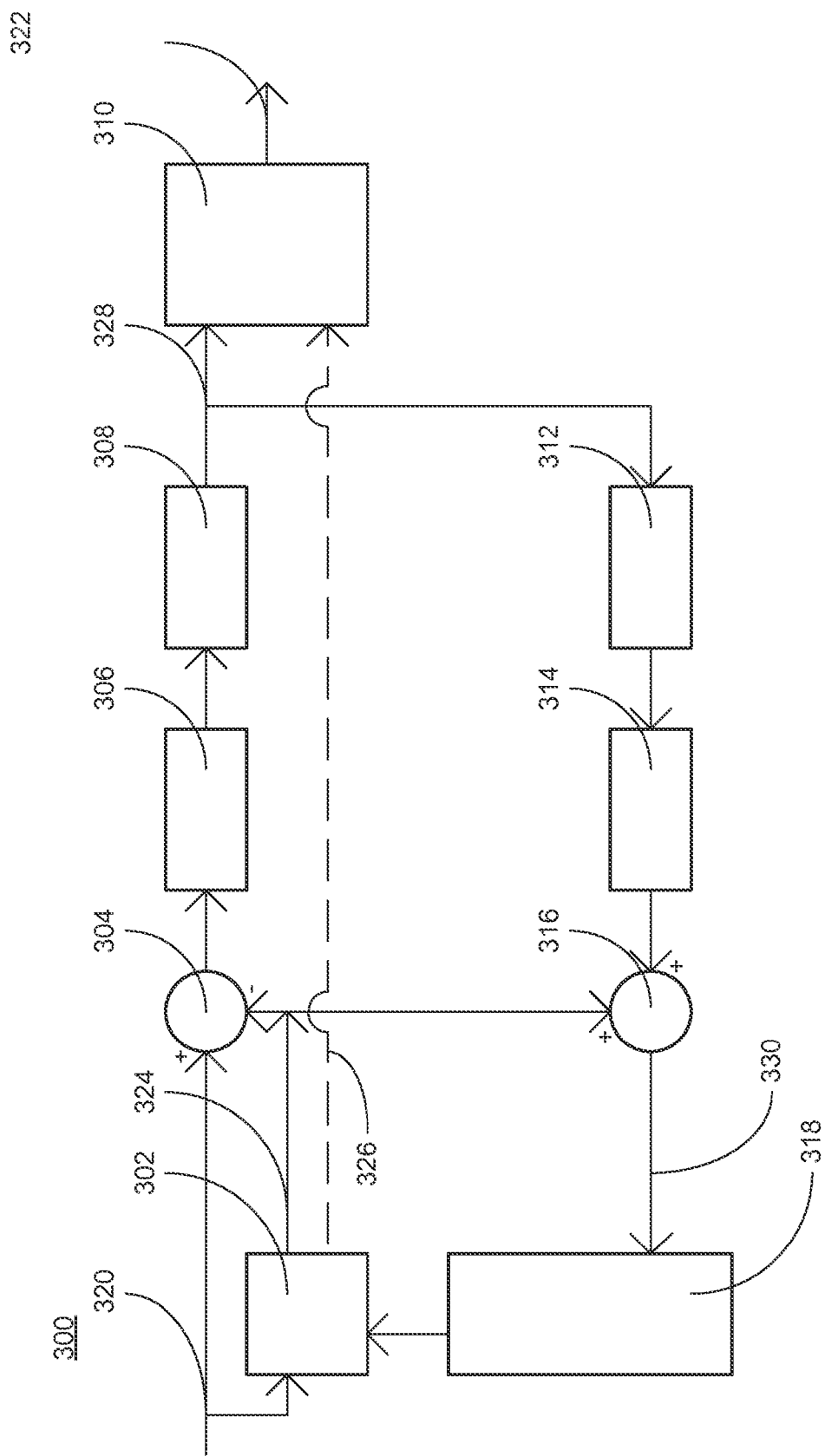
FIG. 3 is a block diagram of an example of a video encoder.

FIG. 3 is a block diagram of an example of a video encoder. In FIG. 3, a video encoder 300 comprises a motion compensator 302, a first summer 304, a transformer 306, a quantizer 308, an entropy encoder 310, a scaler 312, an inverse transformer 314, a second summer 316, and a buffer 318. Video encoder 300 may be configured to receive original pixel data 320 and to produce an encoded bitstream 322.

In order to understand the functions of the components of video encoder 300, it may be helpful to explain a theory underlying a common method in which the same or similar data spatially distributed at different locations of a frame may be compressed. Referring to FIGS. 1 and 3, original pixel data 320 of frame 100 may conceptually be presented in a Matrix I as follows:

$$I$$

$$\begin{bmatrix} B & B & B & B & B \\ B & W & B & B & B \\ B & B & B & B & B \\ G & G & G & G & G \end{bmatrix}$$

Where B may correspond to the value for data that represent blue in a pixel, W may correspond to the value for data that represent white in a pixel, and G may correspond to the value for data that represent green in a pixel. Matrix I may generally represent frame 100 as rows of blue pixels for sky 104, a row of green pixels for field 106, and an element of white pixels for baseball 102. The values in Matrix I may be a function of distance along a horizontal axis and a vertical axis. They may be presented in the distance domain.

Video compression processes may take advantage of the teachings of Joseph Fourier, who demonstrated that any original function that may be periodic in an original domain may be expressed as a sum of elements in a set of sinusoidal functions. Each element in the set of sinusoidal functions may have its own frequency, phase shift, and coefficient. In this manner, the sum of the elements in the set of sinusoidal functions: (1) may replicate the shape of the original function and (2) may allow the original function to be expressed in a frequency domain.

Additionally, for the purpose of exploiting the teachings of Fourier, any original random function having a finite interval may be expressed as a periodic function simply by repeating the original random function. For example, in Matrix I, the original random function of the second row, B W B B B, may be expressed as a periodic function, B W B B B B W B B B B W B B B.

In comparing Matrix I with FIG. 1, for example, the occurrence of the value for the blue pixels across the rows may generally be viewed as unvarying in the horizontal direction, as illustrated at a graph 110. The occurrence of the value for the green pixels across the rows may generally be viewed as varying at a high frequency in the horizontal direction, as illustrated at a graph 112, which peaks at numerous points that may correspond to the locations of the blades of grass of field 106 in frame 100. The occurrence of the value for the white pixels across the rows may generally be viewed as varying at a low frequency in the horizontal direction, as illustrated at a graph 114, which peaks at a point that may correspond to the location of baseball 102 in frame 100. A similar analysis may be done for the columns. For example, the occurrence of the value for the blue pixels down the columns may generally be viewed as unvarying in the vertical direction as illustrated at a graph 116. The occurrence of the value for the white pixels down the columns may generally be viewed as varying at a low frequency in the vertical direction, as illustrated at a graph 118, which peaks at a point that may correspond to the location of baseball 102 in frame 100. The occurrence of the value for the green pixels down the columns may generally be viewed as varying at a low frequency in the vertical direction, as illustrated at a graph 120, which peaks at a point that may correspond to the location of field 106 in frame 100.

Mathematicians have further developed the teachings of Fourier to develop functions to transform an original function that may be periodic in an original domain to a corresponding function that may be expressed in the frequency domain. Such transform functions also have corresponding inverse transform functions to transform the function expressed in the frequency domain back to the original function. Among the transform functions that have been developed to be used when the original function comprises a set of discrete samples may be, for example, the various forms of the Discrete Cosine Transform. Transform functions for sets of discrete samples may be expressed in matrices having an equal number of rows and columns so that, usually, the cross product of the transform function and its inverse transform function may be the identity matrix, a square matrix in which the value of each of the elements diagonally from the top, left corner to the bottom, right corner may be one and the value of each of the other elements may be zero.

Because transform functions for sets of discrete samples may be expressed in matrices having an equal number of rows and columns and because the cross product of the transform function and its inverse transform function may usually be the identity matrix, such a transform function should operate on a matrix that has the same number of rows and columns as the transform function. In a situation where an image has an unequal number of rows and columns, such as, for example, the image represented by Matrix I, the last row or the last column may be replicated until there are an equal number of rows and columns. For example, Matrix I may be modified to produce a Matrix I$^+$ as follow:

$$I^+ \\ \begin{bmatrix} B & B & B & B & B \\ B & W & B & B & B \\ B & B & B & B & B \\ G & G & G & G & G \\ G & G & G & G & G \end{bmatrix}$$

The results of performing a transform using a Matrix II operating on Matrix I$^+$ may be presented in a Matrix III as follows:

$$\begin{array}{ccc} I^+ & II & III \end{array}$$
$$\begin{bmatrix} B & B & B & B & B \\ B & W & B & B & B \\ B & B & B & B & B \\ G & G & G & G & G \\ G & G & G & G & G \end{bmatrix} \times \begin{bmatrix} T_{11} & T_{12} & T_{13} & T_{14} & T_{15} \\ T_{21} & T_{22} & T_{23} & T_{24} & T_{25} \\ T_{31} & T_{32} & T_{33} & T_{34} & T_{35} \\ T_{41} & T_{42} & T_{43} & T_{44} & T_{45} \\ T_{51} & T_{52} & T_{53} & T_{54} & T_{55} \end{bmatrix} = \begin{bmatrix} V & M & S & S & M \\ L & S & S & S & S \\ S & S & S & S & S \\ S & S & S & S & S \\ S & S & S & S & S \end{bmatrix}$$

Matrix III may be produced by transformer 306, for example, and the values of the elements of Matrix III may be included in bitstream 322. The values of the elements of Matrix III are referred to as coefficients.

Conversely, the results of performing an inverse transform using a Matrix IV operating on Matrix III may be presented in Matrix I$^+$ reproduced as follows:

$$\begin{array}{ccc} III & IV & I^+ \end{array}$$
$$\begin{bmatrix} V & M & S & S & M \\ L & S & S & S & S \\ S & S & S & S & S \\ S & S & S & S & S \\ S & S & S & S & S \end{bmatrix} \times \begin{bmatrix} I_{11} & I_{12} & I_{13} & I_{14} & I_{15} \\ I_{21} & I_{22} & I_{23} & I_{24} & I_{25} \\ I_{31} & I_{32} & I_{33} & I_{34} & I_{35} \\ I_{41} & I_{42} & I_{43} & I_{44} & I_{45} \\ I_{51} & I_{52} & I_{53} & I_{54} & I_{55} \end{bmatrix} = \begin{bmatrix} B & B & B & B & B \\ B & W & B & B & B \\ B & B & B & B & B \\ G & G & G & G & G \\ G & G & G & G & G \end{bmatrix}$$

A decoder receiving the coefficients of Matrix III in bitstream 322 may use Matrix IV to reproduce Matrix I$^+$.

In Matrix III, V may represent a very large value, L may represent a large value, M may represent a medium value, and S may represent a small value. The coefficient in the top, left corner of Matrix III may correspond to the weighted value of pixels in frame 100 whose values generally do not vary in both the horizontal and vertical directions. From left to right in the rows of Matrix III, each coefficient may correspond to the weighted value of pixels in frame 100 whose values vary in the horizontal direction. The further to the right a coefficient is in the rows of Matrix III, the greater the frequency of variation in the horizontal direction may be. From top to bottom in the columns of Matrix III, each coefficient may correspond to the weighted value of pixels in frame 100 whose values vary in the vertical direction. The further down a coefficient is in the columns of Matrix III, the greater the frequency of variation in the vertical direction may be.

For example, the very large value of the coefficient in the top, left corner of Matrix III may correspond to the weighted values of the blue pixels that may correspond to the location of sky 104 in frame 100 whose values generally do not vary in both the horizontal and vertical directions. The middle value of the coefficient in the first row, second to the right from the top, left corner of Matrix III may, for example, correspond to the weighted values of the white pixels that may correspond to the location of baseball 102 in frame 100 whose values may vary at a low frequency in the horizontal direction. The large value of the coefficient in the first column, second down from the top, left corner of Matrix III may, for example, correspond to the weighted values of the white pixels that may correspond to the location of baseball 102 in frame 100 and the weighted values of the green pixels that may correspond to the location of field 106 in frame 100 both of whose values may vary at a low frequency in the vertical direction. The middle value of the coefficient in the top, right corner of Matrix III may, for example, correspond to the weighted values of the green pixels that may correspond to the locations of the blades of grass of field 106 in frame 100 whose values may vary at a high frequency in the horizontal direction.

Note that, unlike Matrix I$^+$, where significant information may be included in the values of all of the elements, in Matrix III most of the information may be included in the values of just a few of the coefficients. One of the ways in which video compression processes may reduce the number of bits needed to represent images in video may be by eliminating those bits whose values do not contain a significant amount of information.

For example, if in Matrix III the value of X is 9.7, the value of L is 6.1, the value of M is 4.6, and the value of S is 1.2, then a thresholding process applied to the coefficients in Matrix III may reset the values of all coefficients having values less than 2.0 to 0 to produce a Matrix III' as follows:

$$III' \begin{bmatrix} 9.7 & 4.6 & 0 & 0 & 4.6 \\ 6.1 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

In ordering the coefficients of Matrix III' into bitstream 322, entropy encoder 310, for example, may replace series of instances in which the values are zero with a binary code, thereby reducing the number of bits in bitstream 322. A decoder receiving the coefficients of Matrix III' in bitstream 322 may use Matrix IV to produce a Matrix $I^{+\prime}$ as follows:

$$\begin{matrix} III' & IV \\ \begin{bmatrix} 9.7 & 4.6 & 0 & 0 & 4.6 \\ 6.1 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} & \times \begin{bmatrix} I_{11} & I_{12} & I_{13} & I_{14} & I_{15} \\ I_{21} & I_{22} & I_{23} & I_{24} & I_{25} \\ I_{31} & I_{32} & I_{33} & I_{34} & I_{35} \\ I_{41} & I_{42} & I_{43} & I_{44} & I_{45} \\ I_{51} & I_{52} & I_{53} & I_{54} & I_{55} \end{bmatrix} = \end{matrix}$$

$$I^{+\prime} \begin{bmatrix} B' & B' & B' & B' & B' \\ B' & W' & B' & B' & B' \\ B' & B' & B' & B' & B' \\ G' & G' & G' & G' & G' \\ G' & G' & G' & G' & G' \end{bmatrix}$$

To the extent that the value of B' in Matrix $I^{+\prime}$ may not equal the value of B in Matrix $I^+$, the value of W' in Matrix $I^{+\prime}$ may not equal the value of W in Matrix $I^+$, or the value of G' in Matrix $I^{+\prime}$ may not equal the value of G in Matrix $I^+$, distortion in the video produced using Matrix $I^{+\prime}$ and introduced as a result of using Matrix III' instead of Matrix III may be thought of as a tradeoff that favors a short bitstream at the expense of the fidelity of the images represented in the video.

In another example, the coefficients in Matrix III may be quantized. For example, an eight-step quantizer (quantizer 308, for example) may assign quantized values for the coefficients of Matrix III as follows: 0≤coefficients<1.25 are assigned a quantized value of 0, 1.25≤coefficients<2.5 are assigned a quantized value of 1, 2.5≤coefficients<3.75 are assigned a quantized value of 2, 3.75≤coefficients<5 are assigned a quantized value of 3, 5≤coefficients<6.25 are assigned a quantized value of 4, 6.25≤coefficients<7.5 are assigned a quantized value of 5, 7.5≤coefficients<8.75 are assigned a quantized value of 6, and 8.75≤coefficients<10 are assigned a quantized value of 7. Using such an eight-step quantizer, Matrix III may be modified to produce a Matrix III" as follows:

$$III'' \begin{bmatrix} 7 & 3 & 0 & 0 & 3 \\ 4 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

In ordering the coefficients of Matrix III" into bitstream 322, entropy encoder 310, for example, may replace series of instances in which the values are zero with a binary code, thereby reducing the number of bits in bitstream 322. A decoder receiving the coefficients of Matrix III" in bitstream 322 may use Matrix IV to produce a Matrix $I^{+\prime\prime}$ as follows:

$$\begin{matrix} III'' & IV & I^{+\prime\prime} \\ \begin{bmatrix} 7 & 3 & 0 & 0 & 3 \\ 4 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \times \begin{bmatrix} I_{11} & I_{12} & I_{13} & I_{14} & I_{15} \\ I_{21} & I_{22} & I_{23} & I_{24} & I_{25} \\ I_{31} & I_{32} & I_{33} & I_{34} & I_{35} \\ I_{41} & I_{42} & I_{43} & I_{44} & I_{45} \\ I_{51} & I_{52} & I_{53} & I_{54} & I_{55} \end{bmatrix} = \begin{bmatrix} B'' & B'' & B'' & B'' & B'' \\ B'' & W'' & B'' & B'' & B'' \\ B'' & B'' & B'' & B'' & B'' \\ G'' & G'' & G'' & G'' & G'' \\ G'' & G'' & G'' & G'' & G'' \end{bmatrix} \end{matrix}$$

Again, to the extent that the value of B" in Matrix $I^{+\prime\prime}$ may not equal the value of B in Matrix $I^+$, the value of W" in Matrix $I^{+\prime\prime}$ may not equal the value of W in Matrix $I^+$, or the value of G" in Matrix $I^{+\prime\prime}$ may not equal the value of G in Matrix $I^+$, distortion in the video produced using Matrix $I^{+\prime\prime}$ and introduced as a result of using Matrix III" instead of Matrix III may be thought of as a tradeoff that favors a short bitstream at the expense of the fidelity of the images represented in the video.

If, for example, a two-step quantizer is used to quantize the coefficients in Matrix III, such a two-step quantizer (quantizer 308, for example) may assign quantized values for the coefficients of Matrix III as follows: 0≤coefficients<5 are assigned a quantized value of 0, and 5≤coefficients≤10 are assigned a quantized value of 1. Using such a two-step quantizer, Matrix III may be modified to produce a Matrix III'" as follows:

$$III''' \begin{bmatrix} 1 & 0 & 0 & 0 & 0 \\ 1 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

In ordering the coefficients of Matrix III'" into bitstream 322, entropy encoder 310, for example, may replace series of instances in which the values are zero with a binary code, thereby reducing the number of bits in bitstream 322. A decoder receiving the coefficients of Matrix III'" in bitstream 322 may use Matrix IV to produce a Matrix $I^{+\prime\prime\prime}$ as follows:

$$
\overset{III'''}{\begin{bmatrix} 1 & 0 & 0 & 0 & 0 \\ 1 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}} \times \overset{IV}{\begin{bmatrix} I_{11} & I_{12} & I_{13} & I_{14} & I_{15} \\ I_{21} & I_{22} & I_{23} & I_{24} & I_{25} \\ I_{31} & I_{32} & I_{33} & I_{34} & I_{35} \\ I_{41} & I_{42} & I_{43} & I_{44} & I_{45} \\ I_{51} & I_{52} & I_{53} & I_{54} & I_{55} \end{bmatrix}} =
$$

$$
\overset{I^{+'''}}{\begin{bmatrix} B''' & B''' & B''' & B''' & B''' \\ B''' & W''' & B''' & B''' & B''' \\ B''' & B''' & B''' & B''' & B''' \\ G''' & G''' & G''' & G''' & G''' \\ G''' & G''' & G''' & G''' & G''' \end{bmatrix}}
$$

Again, to the extent that the value of B''' in Matrix $I^{+'''}$ may not equal the value of B in Matrix $I^+$, the value of W''' in Matrix $I^{+'''}$ may not equal the value of W in Matrix $I^+$, or the value of G''' in Matrix $I^{+'''}$ may not equal the value of G in Matrix $I^+$, distortion in the video produced using Matrix $I^{+'''}$ and introduced as a result of using Matrix III''' instead of Matrix III may be thought of as a tradeoff that favors a short bitstream at the expense of the fidelity of the images represented in the video.

Furthermore, a comparison between Matrix III" and Matrix III''' may illustrate the tradeoff between using, for example, an eight-step quantizer and a two-step quantizer. Matrix III''' may have greater number of instances in which the coefficients are zero. Additionally, in Matrix III''', fewer values (and hence a fewer number of bits) may be used in the instances of non-zero coefficients. Therefore, a bitstream produced using Matrix III''' may be shorter than a bitstream produced using Matrix III'''. However, because the difference between the coefficients of Matrix III''' and Matrix III may be greater than the difference between the coefficients of Matrix III''' and Matrix III, a video produced using Matrix III''' may have a greater degree of distortion than a video produced using Matrix III".

In addition to processes in which the same or similar data spatially distributed at different locations of a frame may be compressed, video compression processes also identify instances in which the same or similar values of data may be temporally distributed at corresponding locations of different frames and may replace the data in at least some of these locations with binary codes that identify the redundancy. Because the binary codes may use fewer bits than the original data, the number of bits in the bitstream may be reduced.

Figure 4:
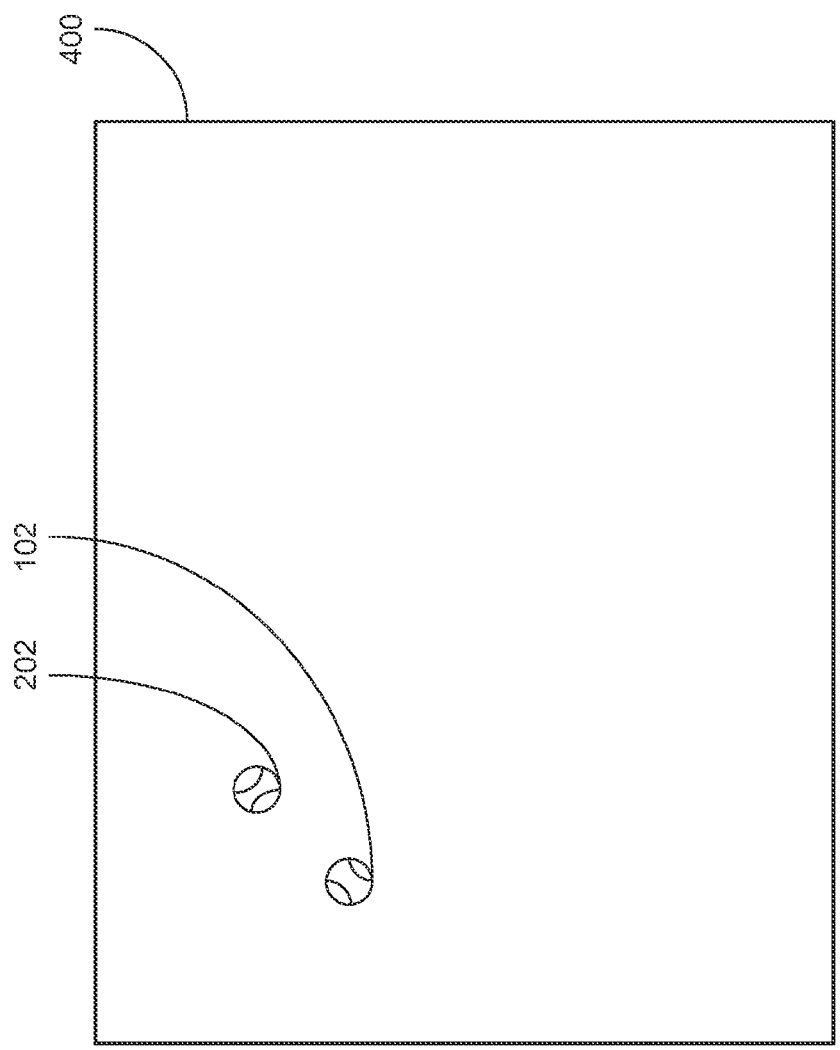
FIGS. 4 and 7 illustrate examples of residual frames.

A common method to compress the same or similar data that may be temporally distributed at corresponding locations of different frames may involve subtracting a previous frame from a current frame to produce a residual frame. FIG. 4 illustrates an example of a residual frame. A residual frame 400, for example, may be the difference of subtracting previous frame 100 from current frame 200. Residual frame 400 may be produced by first summer 304, for example. In residual frame 400, data stored in the pixels that may represent stationary objects in the image of previous frame 100 (e.g., sky 104 and field 106) may cancel data stored in the pixels that may represent stationary objects in the image of current frame 200 (e.g., sky 204 and field 206). In these situations it may be possible to replace at least some of the data stored in the pixels that may represent stationary objects in the image of current frame 200 with binary codes that identify that the at least some of the data may be redundant with corresponding data stored in the pixels that may represent stationary objects in the image of previous frame 100. This method, however, may be ineffective for data stored in the pixels that may represent objects located at one position in previous frame 100 and at another position in current frame 200. Note that residual frame 400 includes both baseball 102 from previous frame 100 and baseball 202 from current frame 200.

This problem may be addressed by: (1) dividing each of previous frame 100 and current frame 200 into square blocks of pixels, (2) comparing, for corresponding blocks, the values of the pixel data to determine if an object may be located at one position in previous frame 100 and at another position in current frame 200, (3) if it has been determined that the object has changed locations, searching the values of the pixel data in previous frame 100 with the values of the pixel data of the block in current frame 200 that may include the object to identify an optimal match, and (4) if an optimal match has been found, determining a magnitude and a direction for a motion vector that may represent the change in location of the object from previous frame 100 to current frame 200.

Figure 5:
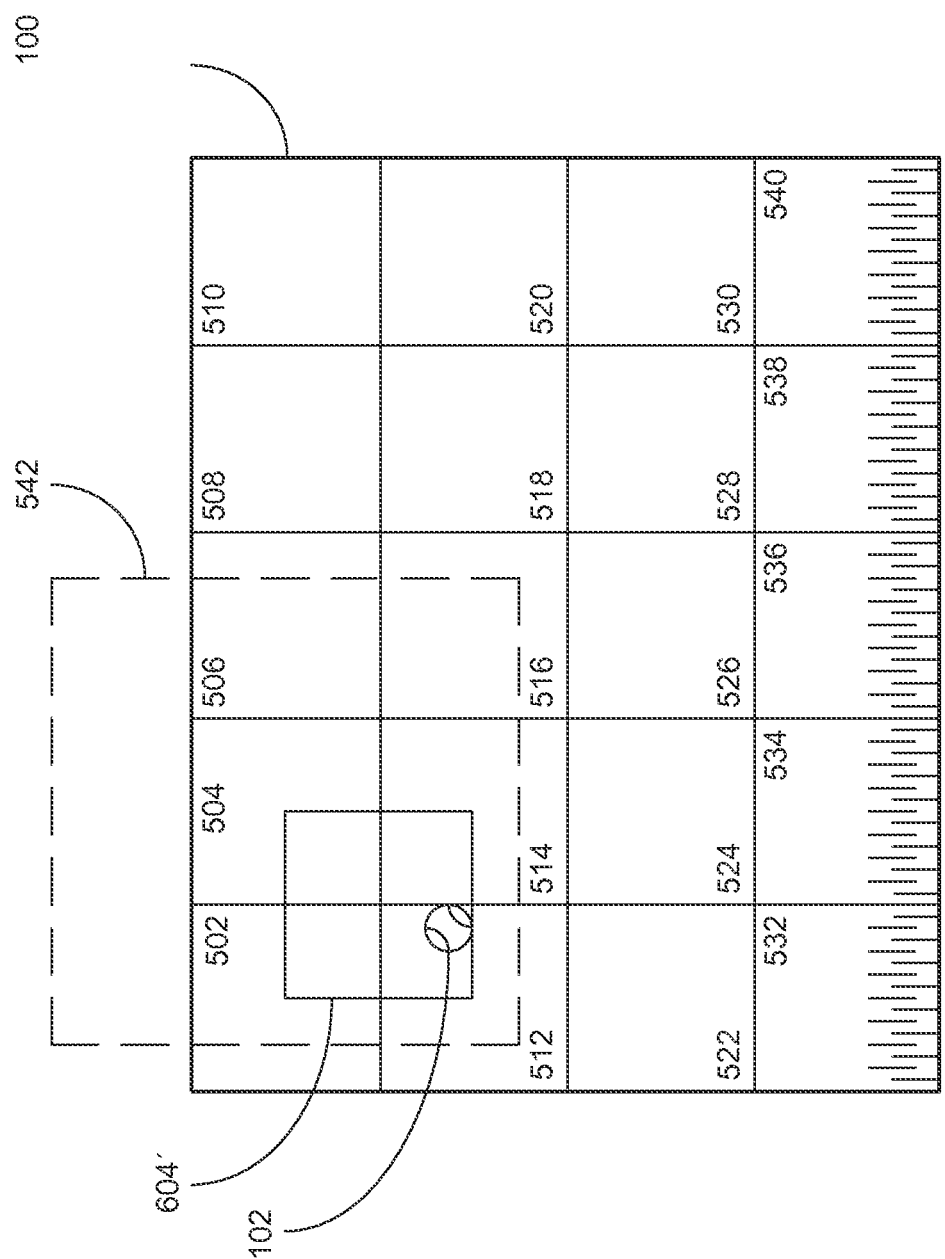
FIGS. 5 and 6 illustrate examples of frames divided into square blocks.
Figure 6:
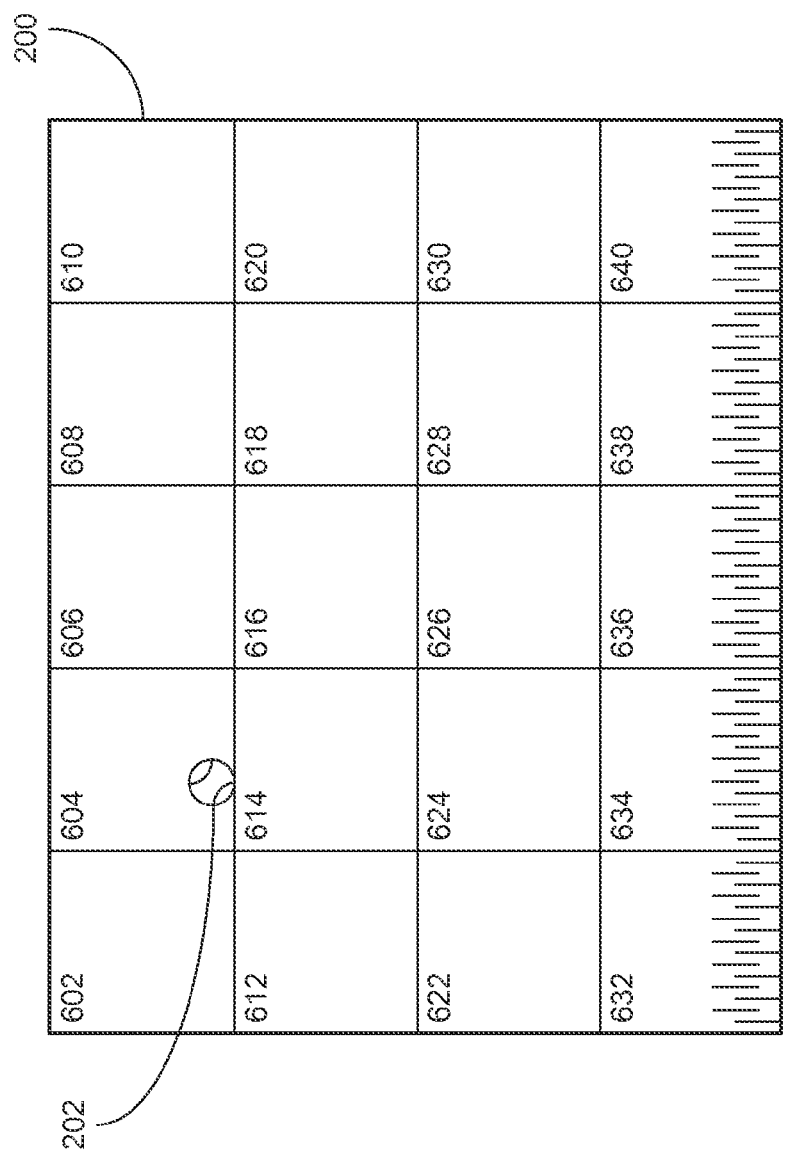

FIGS. 5 and 6 illustrate examples of frames divided into square blocks. Some technical standards for video compression may use square blocks of 64 pixels. Other sizes may also be used. Other technical standards may use square blocks of 256 pixels and refer to these as macroblocks. Accordingly, processes performed upon blocks, as described below, may similarly be performed upon macroblocks and the terms block and macroblock may be used interchangeably. In FIG. 5, previous frame 100 may be divided into square blocks; in FIG. 6, current frame 200 may be divided into square blocks.

First, for corresponding blocks, the values of the pixel data may be compared. Such comparisons may be performed by motion compensator 302, for example. A block 502 may be compared with a block 602, a block 504 may be compared with a block 604, etc. With the exception of the comparisons between blocks 504 and 604 and between blocks 512 and 612, the other comparisons may demonstrate that the objects in the blocks have remained in the same locations.

Next, because the comparison between blocks 504 and 604 may indicate that the location of baseball 102 in previous frame 100 is different from the location of baseball 202 in current frame 200, the values of the pixel data in previous frame 100 may be searched to identify an optimal match with the values of the pixel data of block 604 in current frame 200. Such searches may be performed by motion compensator 302, for example. The search of the values of the pixel data in previous frame 100 may be constrained to a search area 542. Boundaries of search area 542 may be defined as a specific number of bits offset from each of the boundaries of block 504. (If an optimal match is not found within search area 542, then frame 200 may be encoded without compensating for the change in the location of baseball 202.) Alternatively, all of the values of the pixel data in previous frame 100 may be searched to identify an optimal match with the values of the pixel data of block 604 in current frame 200. In FIG. 5, for example, an optimal match may be found with a set of pixels identified as a block 604'.

Finally, a magnitude and a direction for an actual motion vector that may represent the change in the location of the object from previous frame 100 to current frame 200 may be determined. Such a determination may be performed by motion compensator 302, for example. This may be accomplished by determining the differences between the locations of pixels of corresponding corners of blocks 504 and 604'. For example, the horizontal coordinate of the pixel at the top, left corner of block 604' may be subtracted from the horizontal coordinate of the pixel at the top, left corner of block 504 to produce the horizontal component of the actual motion vector, and the vertical coordinate of the pixel at the top, left corner of block 604' may be subtracted from the vertical coordinate of the pixel at the top, left corner of block 504 to produce the vertical component of the actual motion vector.

If, alternatively, all of the values of the pixel data in previous frame 100 are searched to identify an optimal match with the values of the pixel data of block 604 in current frame 200, then if the magnitude of the actual motion vector is sufficiently large, frame 200 may be encoded without compensating for the change in the location of baseball 202.

Figure 7:
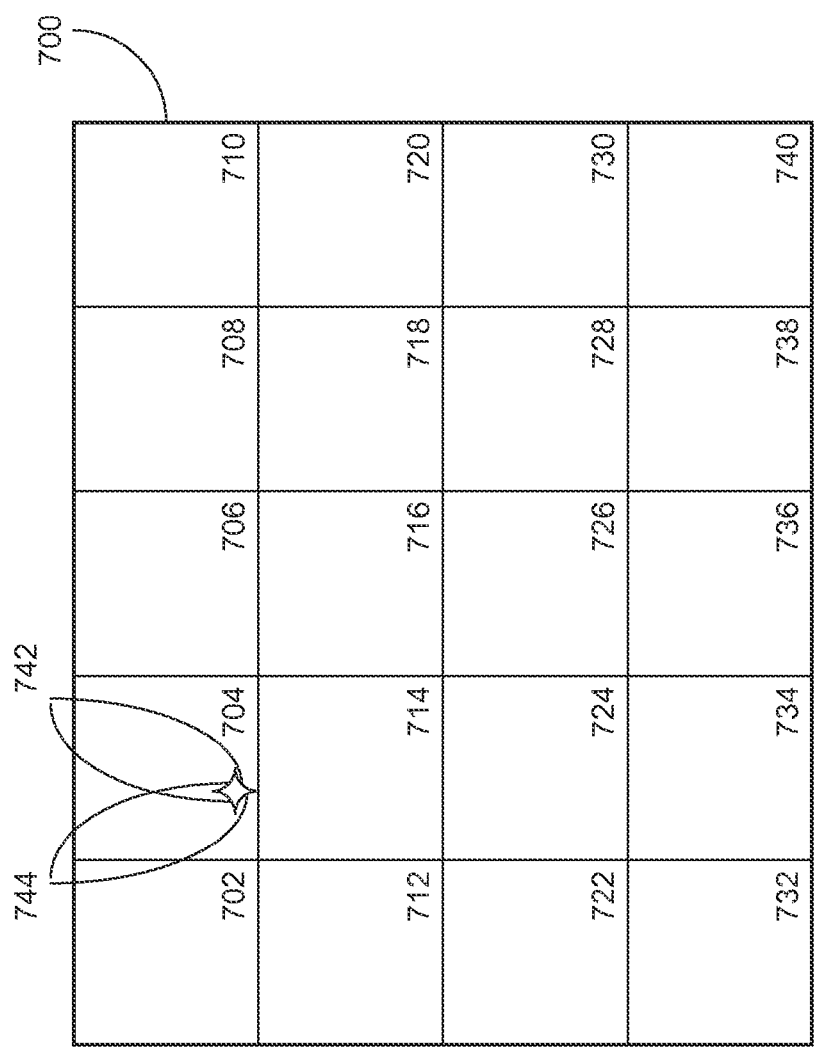

Using the actual motion vector, a prediction of current frame 200 may be produced from previous frame 100 by shifting baseball 102 from its location in frame 100 to the location of baseball 202 in frame 200. Subtracting the prediction of current frame 200 from actual current frame 200 produces a residual frame. FIG. 7 illustrates an example of such a residual frame. A residual frame 700 may be produced by first summer 304, for example. Because the prediction of current frame 200 has shifted baseball 102 from its location in frame 100 to the location of baseball 202 in frame 200, most of the data stored in the pixels of the prediction of current frame 200 may cancel data stored in the pixels of actual current frame 200. Note that residual frame 700, for example, only includes seams 742 of baseball 102 shifted from their location in frame 100 to the location of baseball 202 in frame 200 and seams 744 of baseball 202 in their location in frame 200. Shifting the location of baseball 102 from its location in frame 100 to the location of baseball 202 in frame 200 may not account for the change in the position of the seams of baseball 202 in frame 200 from the position of the seams of baseball 102 in frame 100. Nevertheless, residual frame 700 may represent a substantial compression of the same or similar data that may be temporally distributed at corresponding locations of different frames.

Now to explain, with reference to FIGS. 3 and 7, how video encoder 300 may combine the techniques of temporal compression and spatial compression described above. Assuming that motion compensator 302 may have access to an initial previous frame 100, which is known as a reference picture, motion compensator 302 may receive original pixel data 320 for current frame 200 and may perform the processes described above to produce a prediction 324 for current frame 200 and, possibly, an actual motion vector 326. If actual motion vector 326 is produced and its magnitude is sufficiently small, then motion compensator 302 may transmit actual motion vector 326 to entropy encoder 310.

First summer 304 may receive original pixel data 320 and prediction 324 and may subtract prediction 324 from original pixel data 320 to produce residual frame 700. First summer 304 may transmit residual frame 700 to transformer 306.

Rather than spatially compress residual frame 700 as a whole, as described above, transformer 306 may spatially compresses each of the blocks of residual frame 700 independently. Because the values of the pixel data for all of the blocks of residual frame 700, except for a block 704, may be zero, the coefficients produced by transformer 306 for all of these blocks may also be zero. Moreover, because block 704 has only a small amount of pixel data, most of the coefficients produced by transformer 306 for block 704 may also be zero. Indeed, depending upon the number of steps used by quantizer 308, as described above, it may be the case that all of the quantized values for the coefficients for block 704 may be assigned to zero. The number of steps used by quantizer 308 also may determine the amount of distortion that may be introduced into bitstream 322. If the distortion is sufficiently large, it may be the case that the video produced from the reconstructed data may not include, for example, seams 742 and 744.

Quantizer 308 may transmit quantized coefficients 328 to entropy encoder 310. Entropy encoder 310 may receive quantized coefficients 328 and, possibly, actual motion vector 326 and may produce encoded bitstream 322. Entropy encoder 310 may, for example, replace series of instances in which values are zero with binary codes, thereby reducing the number of bits in bitstream 322.

Quantizer 308 also may transmit quantized coefficients 328 to scaler 312. Scaler 312 and inverse transformer 314 may reverse the processes of transformer 306 and quantizer 308 to produce reconstructed residual frame 700.

Second summer 316 may receive reconstructed residual frame 700 and prediction 324 and may add prediction 324 to reconstructed residual frame 700 to produce reconstructed pixel data 330 for current frame 200. Second summer 316 may transmit reconstructed pixel data 330 to buffer 318. Reconstructed pixel data 330 may be available to motion compensator 302 as a new previous frame 100, which, again, is known as a reference picture. As described above, the number of steps used by quantizer 308 and the number of steps used by scaler 312 may determine the amount of distortion in the video produced by reconstructed pixel data 330.

Nevertheless, in the manner just described it may be possible to compress many frames from an initial previous frame 100, particularly if it may be possible to produce sufficiently accurate actual motion vectors 326 with magnitudes that are sufficiently small.

Additionally, further compression may be realized in bitstream 322 by transmitting, when possible, difference motion vectors for each of the blocks rather than actual motion vectors for each of the blocks. Just as the use of residual frame 700 represents a substantial compression of the same or similar data that may be temporally distributed at corresponding locations of different frames, the use of difference motion vectors may also represent a substantial compression of the same or similar data that may be temporally distributed at corresponding locations of different frames. For a block, a difference motion vector may be the difference between an actual motion vector for the block and a predicted motion vector for the block. Because a difference motion vector may be smaller than an actual motion vector, the difference vector may use fewer bits than the actual motion vector, which may reduce the number of bits in bitstream 322.

For a current block, a predicted motion vector may be produced from at least one actual motion vector of at least one previously encoded block that is nearby the current block. For example, according to some technical standards for video compression, a predicted motion vector for a current block may be a median of: (1) an actual motion vector for a block immediately to the left of the current block, if available; (2) an actual motion vector for a block immediately above the current block, if available; and (3) an actual motion vector for a block immediately above and to the right of the current block. In FIG. 6, for example, a predicted motion vector for a current block 618, for example, may be a median of: (1) an actual motion vector for block 616; (2) an actual motion vector for block 608; and (3) an actual motion vector for block 610.

Video compression processes for storage on certain data storage devices such as, for example, a digital video disk, may present special challenges. On the one hand, advantageously, it may be possible to store a complete sequence of original pixel data in memory prior to compression for storage on certain data storage devices. On the other hand, a user viewing video produced by reconstructed pixel data stored on certain data storage devices sometimes may, for example, want to access particular frames in the sequence rather than simply view the entire sequence from its beginning (e.g., skip to certain points in the movie rather than watch all of it in its entirety).

Because the time consumed to locate such a particular frame in the sequence may be sufficiently long enough to detract from the enjoyment of the user if locating the particular frame depended upon decoding large numbers of previous frames, some technical standards for video compression prescribe that, periodically in the sequence, frames may be encoded using only spatial compression processes. Such frames may be referred to as I frames, for example.

To compensate for the loss in compression that occurs from the requirement to use I frames in the sequence, some technical standards for video compression allow other frames in the sequence to be encoded using both spatial and temporal compression processes and allow temporal compression processes in which a prediction of a current frame may be produced to use both a previous frame and a subsequent frame. Such frames may be referred to as B frames, for example. The use of both a previous frame and a subsequent frame may be possible if the complete sequence of original pixel data is stored in memory prior to compression. Moreover, the use of both a previous frame and a subsequent frame may improve the accuracy of the prediction of a current frame and thus may improve the compression of this frame.

In order to manage a protocol in which a prediction of a current frame may be produced using both a previous frame and a subsequent frame, some technical standards for video compression prescribe that, periodically in the sequence, frames may be encoded using both spatial and temporal compression processes, but limit the temporal compression processes to those in which a prediction of a current frame may be produced using only a previous frame. Such frames may be referred to as P frames, for example. Some technical standards for video compression prescribe that temporal compression encoding of a P frame may only use a previous I frame or a previous P frame, and temporal compression encoding of a B frame may only use: (1) a previous I frame or a previous P frame and (2) a subsequent I frame or a subsequent P frame.

Figure 8:
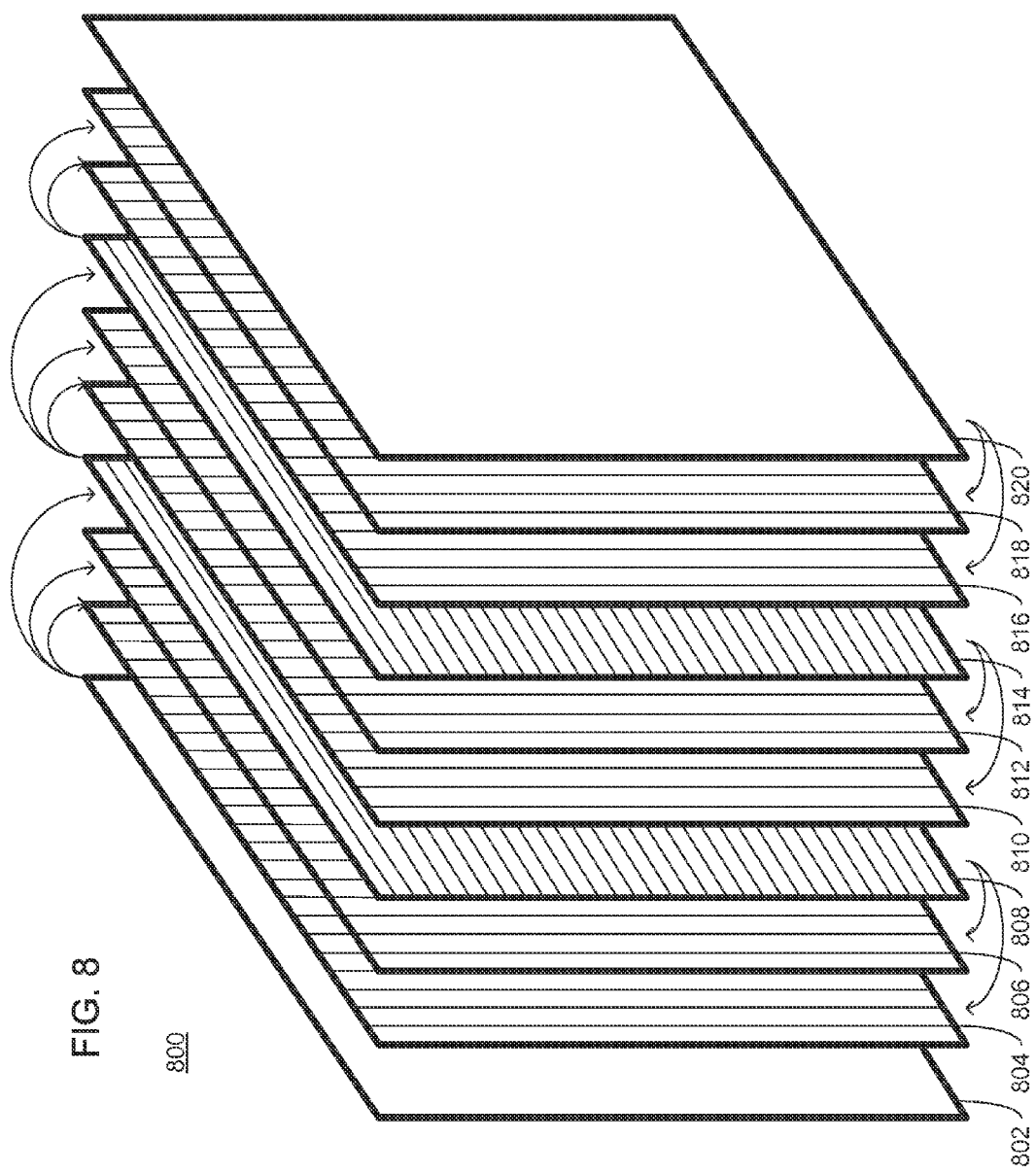
FIG. 8 illustrates an example of an arrangement of I, B, and P frames in a sequence.

FIG. 8 illustrates an example of an arrangement of I, B, and P frames in a sequence. In FIG. 8, for example, a sequence 800 comprises an I frame 802, a B frame 804, a B frame 806, a P frame 808, a B frame 810, a B frame 812, a P frame 814, a B frame 816, a B frame 818, and an I frame 820. P frame 808 may be encoded using previous I frame 802. P frame 814 may be encoded using previous P frame 808. B frame 804 may be encoded using previous I frame 802 and subsequent P frame 808. Likewise, B frame 806 may be encoded using previous I frame 802 and subsequent P frame 808. B frame 810 may be encoded using previous P frame 808 and subsequent P frame 814. Likewise, B frame 812 may be encoded using previous P frame 808 and subsequent P frame 814. B frame 816 may be encoded using previous P frame 814 and subsequent I frame 820. Likewise, B frame 818 may be encoded using previous P frame 814 and subsequent I frame 820.

Sequence 800 shows the frames in the order in which they may be presented, according to their frame numbers. However, in order for the decoding processes to operate correctly, entropy encoder 310, for example, may change the order in which data for the frames are placed into bitstream 322, for example, to: I frame 802, P frame 808, B frame 804, B frame 806, P frame 814, B frame 810, B frame 812, I frame 820, B frame 816, and B frame 818. This order of frames may be set according to what is known as the picture order count.

As video compression processes have become further refined they have evolved to include additional degrees of frame divisions, a hierarchy of processes, and protocols that determine which processes may be performed upon which degrees of division.

First, the introduction of the ability to use more than one reference picture for temporal compression processes may give rise to a need to manage the various reference pictures. To accomplish this task, some technical standards for video compression prescribe that compliant encoders and decoders maintain at least one reference picture list. With reference to FIG. 3, for example, a reference picture may be produced from reconstructed pixel data 330 and stored in buffer 318.

Second, video compression processes have evolved to change having the determination of: (1) the types of compression processes and (2) the number of reference pictures that may be used from being made for frames to being made for divisions of frames known as slices.

Figure 9:
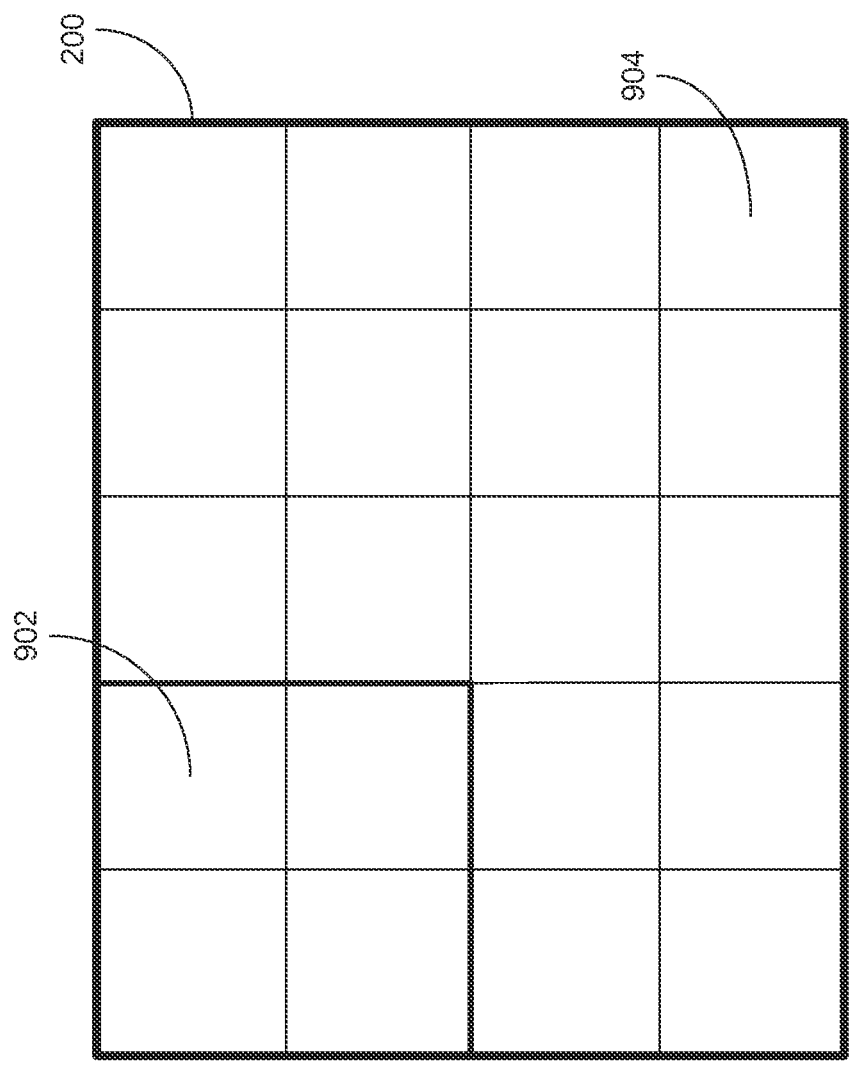
FIGS. 9 and 10 illustrate examples of frames divided into slices.
Figure 10:
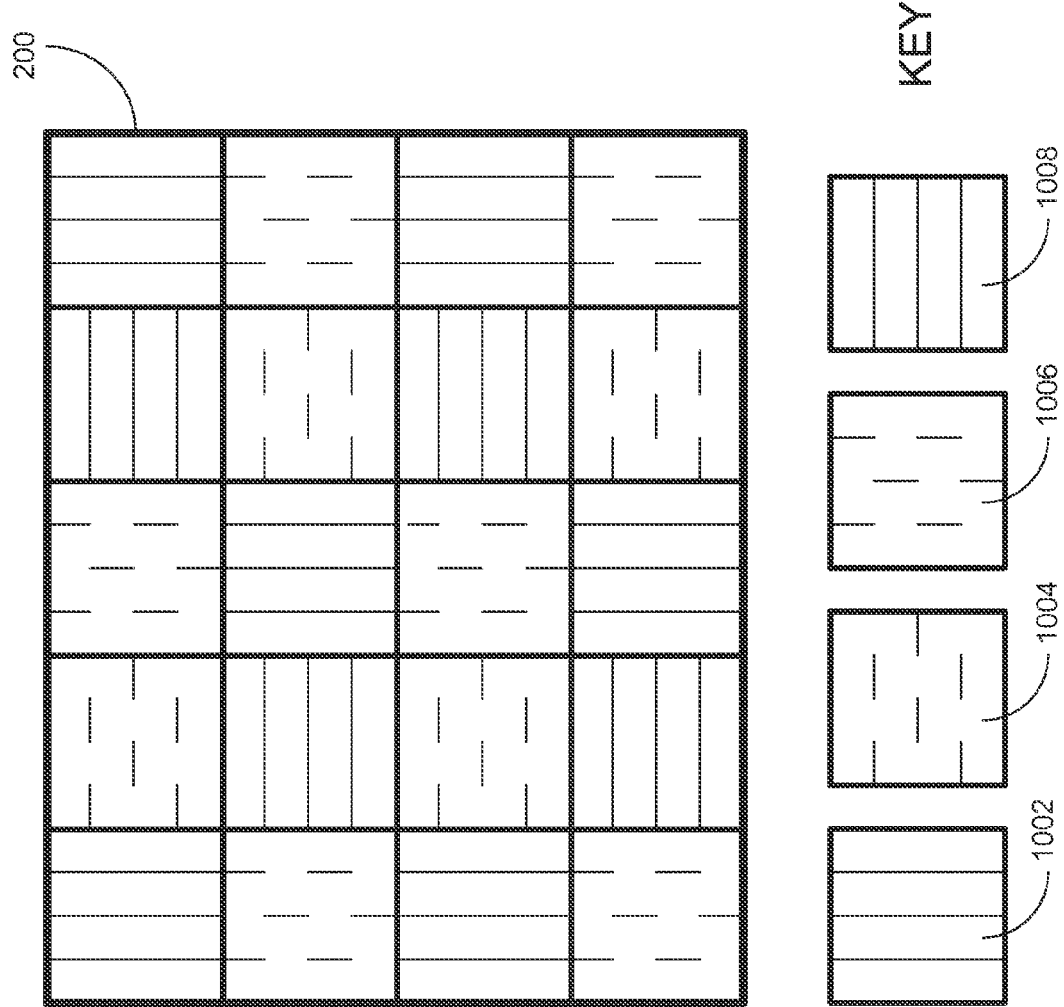

According to some technical standards for video compression, a frame may be divided into a number of slices ranging from one (i.e., the whole frame is a slice) to the number of blocks in the frame. Each slice may have an arbitrary shape, but each slice contains a whole number of blocks. FIGS. 9 and 10 illustrate examples of frames divided into slices.

In FIG. 9, for example, frame 200 may be divided into a slice 902 and a slice 904. Smaller slice 902, for example, may correspond to a portion of current frame 200 in which a location of an object (e.g., baseball 202) may be different from the location of the object (e.g., baseball 102) in previous frame 100. Larger slice 904, for example, may correspond to a portion of current frame 200 in which a location of an object (e.g., sky 204 and field 206) is the same as or similar to the location of the object (e.g., sky 104 and field 106) in previous frame 100.

The blocks from which the slices are formed may not need to be contiguous. In FIG. 10, for example, frame 200 has four slices denoted by patterns in the blocks. Using the key in FIG. 10, for example, frame 200 has a slice 1002, a slice 1004, a slice 1006, and a slice 1008.

With the introduction of slices, it may be possible to change having the determination of: (1) the types of compression processes and (2) the number of reference pictures that may be used from being made for frames to being made for slices. So, according to some technical standards for video compression, rather than using I frames, B frames, and P frames, for example, I slices, B slices, and P slices may be used. Moreover, some technical standards for video compression prescribe that an I slice may contain only I blocks; a B slice may contain I blocks, B blocks, or both; and a P slice may contain I blocks, P blocks, or both.

Third, although the block may remain the basic unit upon which spatial compression processes are performed, according to some technical standards for video compression, temporal compression processes may now be performed on partitions of the block.

Fourth, contrary to the scheme presented above with respect to FIG. 8, according to some technical standards for video compression, the distinction between a P block and a B block may not depend upon the number of reference pictures from which the block may be encoded, but rather may depend upon the number of reference picture lists from which a reference picture may be selected to encode the block.

For example, a P block may be encoded using a reference picture selected from only one reference picture list. The P slice that includes the P block may be configured to be encoded using only one reference picture list. For a P block, the reference picture list may include a finite number of reference pictures. The motion compensator (motion compensator 302, for example) may choose a best match, for example, among the reference pictures on the reference picture list. When a reference picture is produced, it may be considered for inclusion on the reference picture list. Because reference pictures may be produced according to their picture order numbers rather than their frame numbers, it may be the case that the reference picture corresponds to a previous frame or a subsequent frame. This is contrary to the limitation with respect to P frames presented above with respect to FIG. 8 in which only previous frames were used. Generally, reference pictures included on the reference picture list may be ordered according to their frame numbers. The position of each reference picture on the reference picture list may be tracked by an index number such that the reference picture with the highest frame number has the lowest index number. Reference pictures with progressively lower frame numbers may have progressively higher index numbers. If the reference list includes its maximum number of reference pictures and a new reference picture is to be added, the reference picture currently on the reference list and having the lowest frame number may be removed so that the new reference picture may be added.

For example, a B block may be encoded using a reference picture selected from one or two reference picture lists. The B slice that includes the B block may be configured to be encoded using two reference picture lists. Generally, reference pictures included on the reference picture lists may be ordered according to their picture order count. All reference pictures in the buffer (buffer 318, for example) are included on both reference picture lists, but a distinction may be made between those reference pictures in the buffer that have a picture order count that is lower than the picture order count of the current frame and those reference pictures in the buffer that have a picture order count that is higher than the picture order count of the current frame.

On a first reference picture list, those reference pictures in the buffer that have a picture order count that is lower than the picture order count of the current frame may be tracked by an index number such that the reference picture with the highest picture order count has the lowest index number. Reference pictures with progressively lower picture order counts may have progressively higher index numbers. Once the reference pictures in the buffer that have a picture order count that is lower than the picture order count of the current frame have been ordered on the first reference picture list, the reference pictures in the buffer that have a picture order count that is higher than the picture order count of the current frame may be added so that reference pictures with progressively higher picture order counts have progressively higher index numbers.

On a second reference picture list, those reference pictures in the buffer that have a picture order count that is higher than the picture order count of the current frame may be tracked by an index number such that the reference picture with the lowest picture order count has the lowest index number. Reference pictures with progressively higher picture order counts have progressively higher index numbers. Once the reference pictures in the buffer that have a picture order count that is higher than the picture order count of the current frame have been ordered on the second reference picture list, the reference pictures in the buffer that have a picture order count that is lower than the picture order count of the current frame may be added so that reference pictures with progressively lower picture order counts have progressively higher index numbers.

For a B block, the motion compensator (motion compensator 302, for example) may choose a best match, for example, among the reference pictures on both reference picture lists. The motion compensator may choose to use one or two reference pictures. This is contrary to the limitation with respect to B frames presented above with respect to FIG. 8 in which two reference pictures were used. If the motion compensator chooses to use two reference pictures, one must be selected from the first reference picture list and the other must be selected from the second reference picture list.

Because reference pictures may be produced according to their picture order numbers rather than their frame numbers, it may be the case that both reference pictures correspond to previous frames or both reference pictures correspond to subsequent frames. This is contrary to the limitation with respect to B frames presented above with respect to FIG. 8 in which both a previous frame and a subsequent frame were used.

In order to reduce the number of bits in the bitstream, some technical standards for video compression may provide for default processes to be performed by decoders compliant with the technical standard in the absence of binary codes directing different processes. For example, according to some technical standards for video compression, if the entropy encoder (entropy encoder 302, for example) does not transmit a difference motion vector for a current block in the bitstream, the decoder may, by default, use the predicted motion vector for the current block, which may be derived from at least one actual motion vector of at least one received previously encoded block that may be nearby the current block.

According to some technical standards for video compression, for example, for a B block, a direct mode is available in which the entropy encoder (entropy encoder 302, for example) does not transmit a difference motion vector for a current B block in the bitstream, and the decoder may, by default, use the predicted motion vector for the current block, which may be derived from at least one actual motion vector of at least one received previously encoded block that is nearby the current block.

Additionally, according to some technical standards for video compression, decoders, by default and in the absence of binary codes directing different processes, may perform temporal compression processes on unpartitioned blocks rather than partitions of the blocks.

Sometimes it may be possible for the entropy encoder to include in the bitstream a binary code that indicates that all other data associated with a block have been excluded from the bitstream. Such a block may be known as a skipped block. In transmitting a skipped block, an encoder may be exploiting the default processes to be performed by a decoder in order to reduce the number of bits in the bitstream. For this reason, the ability to assess a block candidate for conversion to a skipped block may be useful.

Figure 11:
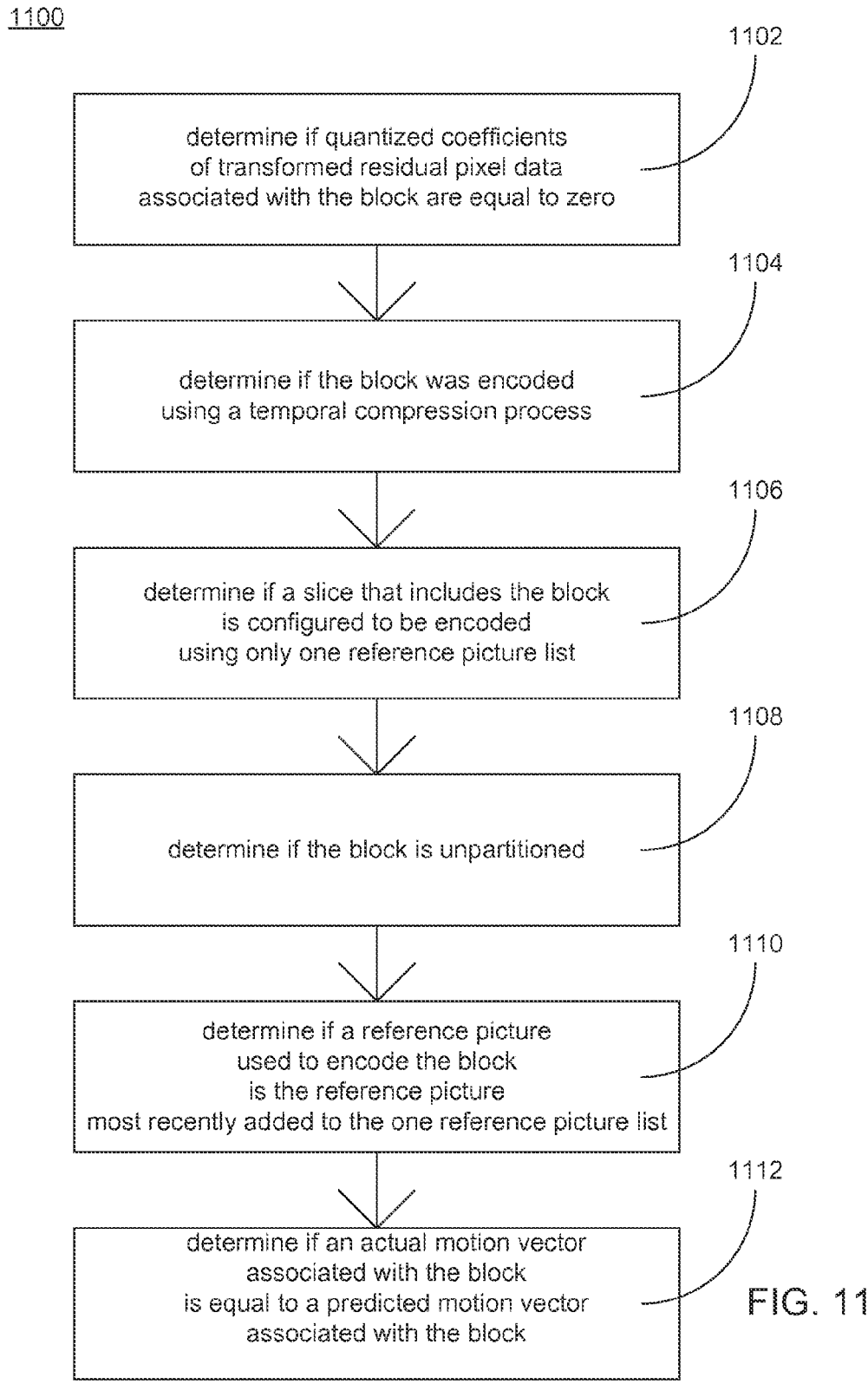
FIGS. 11 and 14 are process flowcharts of example methods for assessing a sequence of encoded data associated with a block of video, according to embodiments.

FIG. 11 is a process flowchart of an example method for assessing a sequence of encoded data associated with a block of video, according to an embodiment. The block may be a macroblock. A method 1100 in FIG. 11 may be performed using at least one electronic processing system that operates hardware, software, firmware, or some combination of these.

In method 1100, at 1102, the at least one electronic processing system may determine if quantized coefficients of transformed residual pixel data associated with the block are equal to zero. According to some technical standards for video compression, the quantized coefficients of transformed residual pixel data associated with the block may be determined to be equal to zero by determining the value of a binary code in the sequence of encoded data. In the Advanced Video Coding standard, for example, the quantized coefficients of transformed residual pixel data associated with the block may be determined to be equal to zero by determining the value of the binary code "coded_block_pattern."

At 1104, the at least one electronic processing system may determine if the block was encoded using a temporal compression process. Such a block may be, for example, a P block or a B block. According to some technical standards for video compression, the block may be determined to have been encoded using a temporal compression process by determining the value of a binary code in the sequence of encoded data. In the Advanced Video Coding standard, for example, the block may be determined to have been encoded using a temporal compression process by determining the value of the binary code "mb_type."

At 1106, the at least one electronic processing system may determine if a slice that includes the block is configured to be encoded using only one reference picture list. Such a slice may be, for example, a P slice. The slice may be a frame. The slice may be a field. According to some technical standards for video compression, the slice that includes the block may be determined to have been configured to be encoded using only one reference picture list by determining the value of a binary code in the sequence of encoded data. In the Advanced Video Coding standard, for example, the slice that includes the block may be determined to have been configured to be encoded using only one reference picture list by determining the value of the binary code "slice_type."

At 1108, the at least one electronic processing system may determine if the block is unpartitioned. According to some technical standards for video compression, the block may be determined to be unpartitioned by determining the value of a binary code in the sequence of encoded data. In the Advanced Video Coding standard, for example, the block may be determined to be unpartitioned by determining the value of the binary code "mb_type."

At 1110, the at least one electronic processing system may determine if a reference picture used to encode the block is the reference picture most recently added to the one reference picture list. According to some technical standards for video compression, the reference picture most recently added to the one reference picture list may be the reference picture associated with the lowest index value on the one reference picture list. According to some technical standards for video compression, a reference picture used to encode the block may be determined to be the reference picture with the lowest index value on the one reference picture list by determining the value of a binary code in the sequence of encoded data. In the Advanced Video Coding standard, for example, a reference picture used to encode the block may be determined to be the reference picture associated with the lowest index value on the one reference picture list by determining the value of the binary code "ref_idx_l0."

At 1112, the at least one electronic processing system may determine if an actual motion vector associated with the block is equal to a predicted motion vector associated with the block.

If the results of method 1100 indicate that the block is a successful candidate, then the sequence of encoded data may be changed to indicate that the block is a skipped block.

Optionally, according to some technical standards for video compression, the at least one electronic processing system may increment a value of a binary code in the sequence of encoded data. The binary code may indicate a consecutive number of blocks whose data are excluded from the sequence of encoded data. In the Advanced Video Coding standard, for example, incrementing a value of the binary code "mb_skip_run" indicates that the block is one of what may be a consecutive number of skipped blocks.

Alternatively, optionally, according to some technical standards for video compression, the at least one electronic processing system may change a value of a binary code in the sequence of encoded data. The binary code may be associated with the block and may indicate that other data associated with the block are excluded from the sequence of encoded data. In the Advanced Video Coding standard, for example, changing the value of the binary code "mb_skip_flag" indicates that the block is a skipped block.

Figure 12:
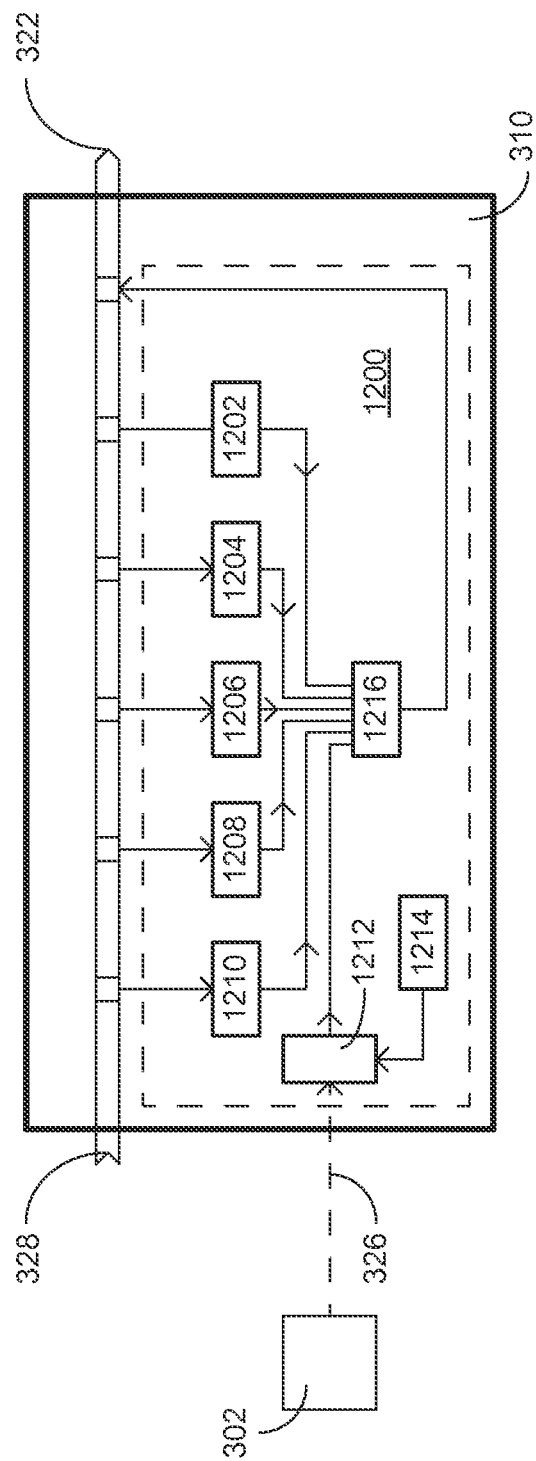
FIGS. 12 and 15 are block diagrams of example systems for assessing a sequence of encoded data associated with a block of video, according to embodiments.

FIG. 12 is a block diagram of an example system for assessing a sequence of encoded data associated with a block of video, according to an embodiment. In FIG. 12, a system 1200 includes, for example, a first electronic processing system 1202, a second electronic processing system 1204, a third electronic processing system 1206, a fourth electronic processing system 1208, a fifth electronic processing system 1210, a sixth electronic processing system 1212, and a memory 1214. Optionally, system 1200 may also include a seventh electronic processing system 1216. Optionally, the functions of first 1202, second 1204, third 1206, fourth 1208, fifth 1210, sixth 1212, and seventh 1216 electronic processing systems may be performed by a single electronic processing system.

First electronic processing system 1202 may be configured to determine if quantized coefficients of transformed residual pixel data associated with the block are equal to zero. According to some technical standards for video compression, the quantized coefficients of transformed residual pixel data associated with the block may be determined to be equal to zero by determining the value of a binary code in sequence 328 of encoded data. In the Advanced Video Coding standard, for example, the quantized coefficients of transformed residual pixel data associated with the block may be determined to be equal to zero by determining the value of the binary code "coded_block_pattern."

Second electronic processing system 1204 may be configured to determine if the block was encoded using a temporal compression process. According to some technical standards for video compression, the block may be determined to have been encoded using a temporal compression process by determining the value of a binary code in sequence 328 of encoded data. In the Advanced Video Coding standard, for example, the block may be determined to have been encoded using a temporal compression process by determining the value of the binary code "mb_type."

Third electronic processing system 1206 may be configured to determine if a slice that includes the block is configured to be encoded using only one reference picture list. Such a slice may be, for example, a P slice. The slice may be a frame. The slice may be a field. According to some technical standards for video compression, the slice that includes the block may be determined to have been configured to be encoded using only one reference picture list by determining the value of a binary code in sequence 328 of encoded data. In the Advanced Video Coding standard, for example, the slice that includes the block may be determined to have been configured to be encoded using only one reference picture list by determining the value of the binary code "slice_type."

Fourth electronic processing system 1208 may be configured to determine if the block is unpartitioned. According to some technical standards for video compression, the block may be determined to be unpartitioned by determining the value of a binary code in sequence 328 of encoded data. In the Advanced Video Coding standard, for example, the block may be determined to be unpartitioned by determining the value of the binary code "mb_type." Because according to some technical standards for video compression the same binary code that may be used to determine if the block was encoded using a temporal compression process may also be used to determine if the block is unpartitioned, the functions of second electronic processing system 1204 and fourth electronic processing system 1208 optionally may be performed by a single electronic processing system.

Fifth electronic processing system 1210 may be configured to determine if a reference picture used to encode the block is the reference picture most recently added to the one reference picture list. According to some technical standards for video compression, the reference picture most recently added to the one reference picture list may be the reference picture associated with the lowest index value on the one reference picture list. According to some technical standards for video compression, a reference picture used to encode the block may be determined to be the reference picture associated with the lowest index value on the one reference picture list by determining the value of a binary code in sequence 328 of encoded data. In the Advanced Video Coding standard, for example, a reference picture used to encode the block may be determined to be the reference picture associated with the lowest index value on the one reference picture list by determining the value of the binary code "ref_idx_10."

Sixth electronic processing system 1212 may be configured to determine if an actual motion vector associated with the block is equal to a predicted motion vector associated with the block. In system 1200, for example, the predicted motion vector associated with the block may be stored in memory 1214. Sixth electronic processing system 1212 may be configured to receive the predicted motion vector associated with the block from memory 1214 and to receive, for example, actual motion vector 326 from motion compensator 302. Sixth electronic processing system 1212 may be configured to compare, for example, actual motion vector 326 associated with the block with the predicted motion vector associated with the block to determine if they are equal.

Optionally, seventh electronic processing system 1216 may be configured to determine if the block is a successful candidate for conversion to a skipped block and, if so, to change sequence 328 of encoded data to produce bitstream 322. Optionally, seventh electronic processing system 1214 may increment a value of a binary code in the sequence of encoded data. The binary code may indicate a consecutive number of blocks whose data are excluded from the sequence of encoded data. In the Advanced Video Coding standard, for example, incrementing a value of the binary code "mb_skip_run" indicates that the block is one of what may be a consecutive number of skipped blocks. Alternatively, optionally, seventh electronic processing system 1216 may change a value of a binary code in the sequence of encoded data. The binary code may be associated with the block and may indicate that other data associated with the block are excluded from the sequence of encoded data. In the Advanced Video Coding standard, for example, changing the value of the binary code "mb_skip_flag" indicates that the block is a skipped block.

Figure 13:
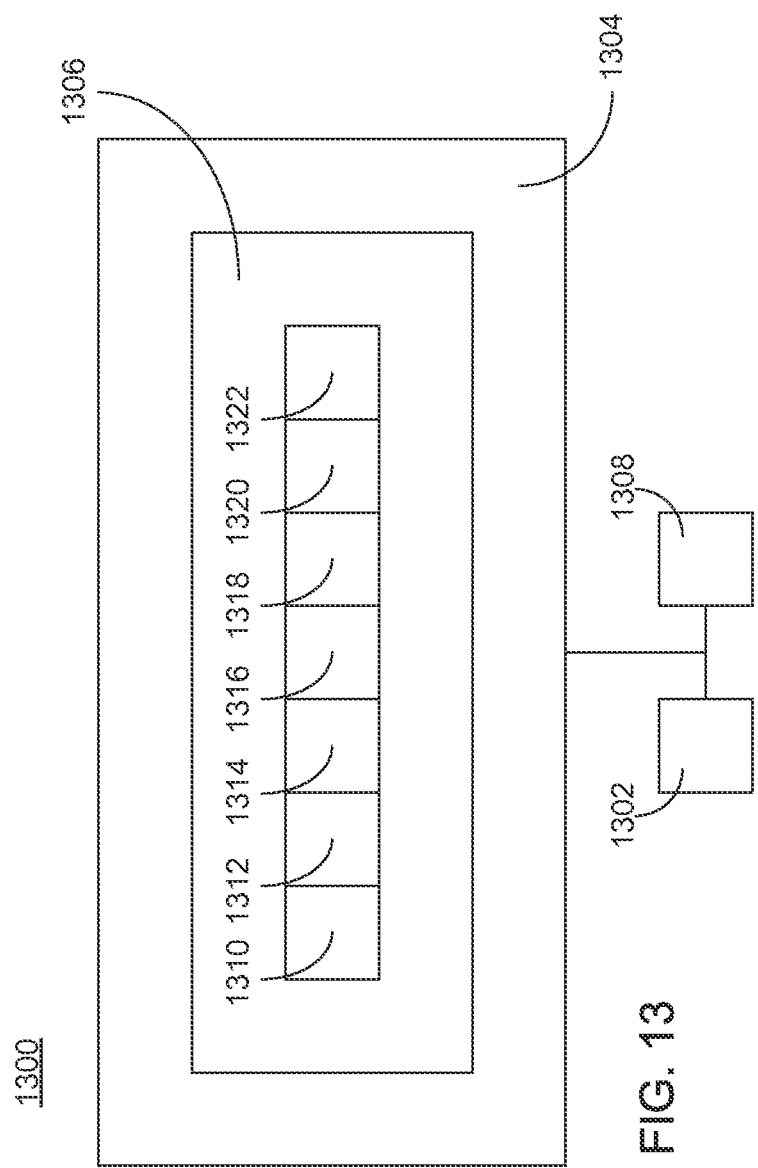
FIGS. 13 and 16 are block diagrams of examples of software or firmware embodiments of, respectively, systems 1200 and 1500, according to embodiments.

FIG. 13 is a block diagram of an example of a software or firmware embodiment of system 1200, according to an embodiment. In FIG. 13, an electronic processing system 1300 includes, for example, one or more programmable processor(s) 1302, a memory 1304, a computer program logic 1306, one or more I/O ports and/or I/O devices 1308, quantized coefficients determination logic 1310, temporal compression determination logic 1312, slice determination logic 1314, block mode determination logic 1316, reference picture determination logic 1318, and motion vector comparison logic 1320. Optionally, electronic processing system 1300 also includes skipped block determination logic 1322.

One or more programmable processor(s) 1302 may be configured to execute the functionality of system 1200 as described above. Programmable processor(s) 1302 may include a central processing unit (CPU) and/or a graphics processing unit (GPU). Memory 1304 may include one or more computer readable media that may store computer program logic 1306. Memory 1304 may be implemented as a hard disk and drive, a removable media such as a compact disk, a read-only memory (ROM) or random access memory (RAM) device, for example, or some combination thereof. Programmable processor(s) 1302 and memory 1304 may be in communication using any of several technologies known to one of ordinary skill in the art, such as a bus. Computer program logic 1306 contained in memory 1304 may be read and executed by programmable processor(s) 1302. The one or more I/O ports and/or I/O devices 1308, may also be connected to processor(s) 1302 and memory 1304.

In the embodiment of FIG. 13, computer program logic 1306 may include quantized coefficients determination logic 1310, which may be configured to receive data values related to quantized coefficients of transformed residual pixel data associated with the block and to determine if they are equal to zero. Computer program logic 1306 may also include temporal compression determination logic 1312, which may be configured to receive data values related to the method of compression of the block and to determine if the block was encoded using a temporal compression process. Computer program logic 1306 may also include slice determination logic 1314, which may be configured to receive data values related to the method of compression of the slice that includes the block and to determine if the slice is configured to be encoded using only one reference picture list. Computer program logic 1306 may also include block mode determination logic 1316, which may be configured to receive data values related to the mode of the block and to determine if the block is unpartitioned. Computer program logic 1306 may also include reference picture determination logic 1318, which may be configured to receive data values related to the reference picture used to encode the block and to determine if the reference picture used to encode the block is the reference picture most recently added to the one reference picture list. Computer program logic 1306 may also include motion vector comparison logic 1320, which may be configured to receive data values related to an actual motion vector associated with the block and a predicted motion vector associated with the block and to determine if they are equal.

Optionally, computer program logic 1306 may also include skipped block determination logic 1322, which may be configured to receive data values from quantized coefficients determination logic 1310, temporal compression determination logic 1312, slice determination logic 1314, block mode determination logic 1316, reference picture determination logic 1318, and motion vector comparison logic 1320, to determine if the block is a successful candidate for conversion to a skipped block, and, if so, to send a signal to change sequence 328 of encoded data to produce bitstream 322. Optionally, skipped block determination logic 1322 may send a signal to increment a value of a binary code in the sequence of encoded data. The binary code may indicate a consecutive number of blocks whose data are excluded from the sequence of encoded data. Alternatively, optionally, skipped block determination logic 1322 may send a signal to change a value of a binary code in the sequence of encoded data. The binary code may be associated with the block and may indicate that other data associated with the block are excluded from the sequence of encoded data.

Figure 14:
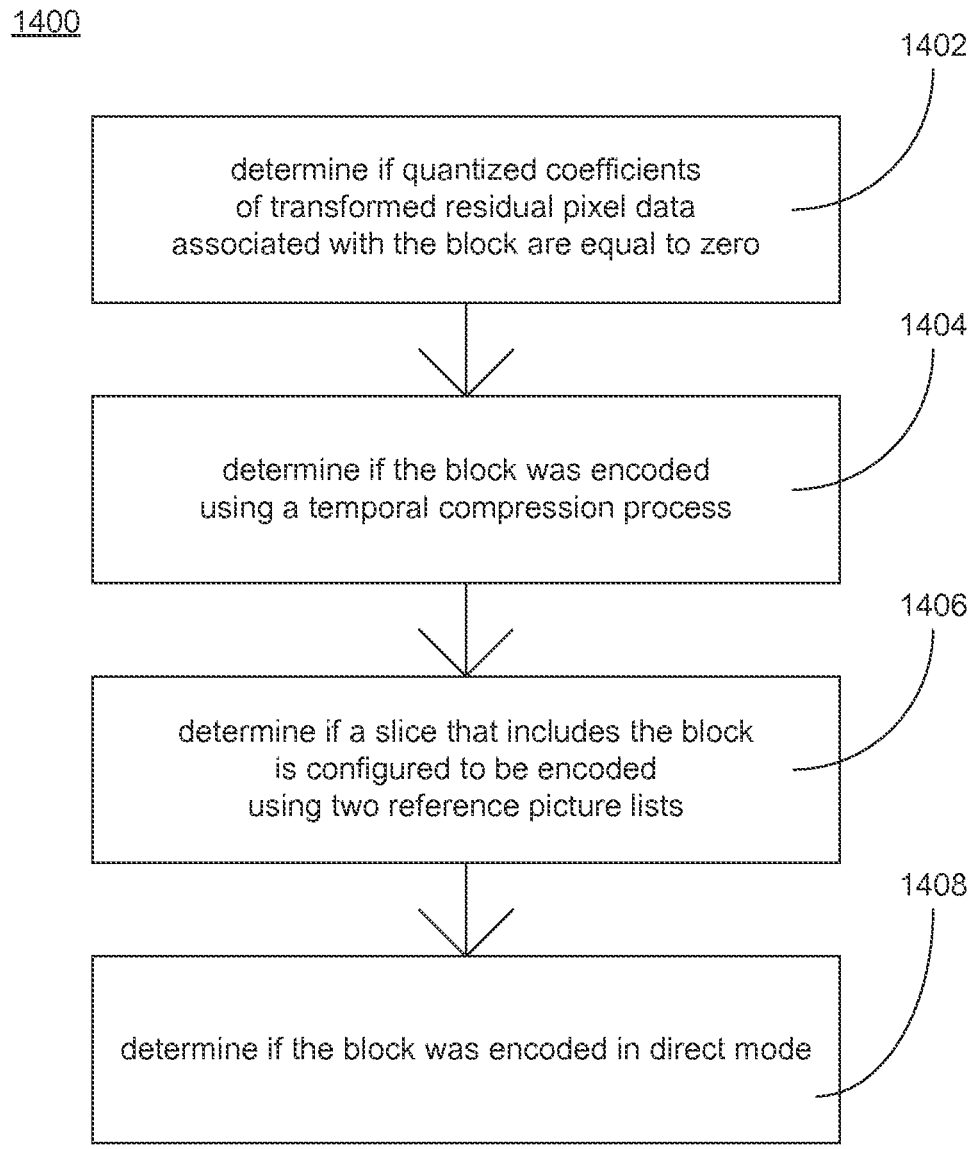

FIG. 14 is a process flowchart of an example method for assessing a sequence of encoded data associated with a block of video, according to an embodiment. The block may be a macroblock. A method 1400 in FIG. 14 may be performed using at least one electronic processing system that operates hardware, software, firmware, or some combination of these.

In method 1400, at 1402, the at least one electronic processing system may determine if quantized coefficients of transformed residual pixel data associated with the block are equal to zero. According to some technical standards for video compression, the quantized coefficients of transformed residual pixel data associated with the block may be determined to be equal to zero by determining the value of a binary code in the sequence of encoded data. In the Advanced Video Coding standard, for example, the quantized coefficients of transformed residual pixel data associated with the block may be determined to be equal to zero by determining the value of the binary code "coded_block_pattern."

At 1404, the at least one electronic processing system may determine if the block was encoded using a temporal compression process. Such a block may be, for example, a P block or a B block. According to some technical standards for video compression, the block may be determined to have been encoded using a temporal compression process by determining the value of a binary code in the sequence of encoded data. In the Advanced Video Coding standard, for example, the block may be determined to have been encoded using a temporal compression process by determining the value of the binary code "mb_type."

At 1406, the at least one electronic processing system may determine if a slice that includes the block is configured to be encoded using two reference picture lists. Such a slice may be, for example, a B slice. The slice may be a frame. The slice may be a field. According to some technical standards for video compression, the slice that includes the block may be determined to have been configured to be encoded using two reference picture lists by determining the value of a binary code in the sequence of encoded data. In the Advanced Video Coding standard, for example, the slice that includes the block may be determined to have been configured to be encoded using two reference picture lists by determining the value of the binary code "slice_type."

At 1408, the at least one electronic processing system may determine if the block was encoded in direct mode. According to some technical standards for video compression, the block may be determined to have been encoded in direct mode by determining the value of a binary code in the sequence of encoded data. In the Advanced Video Coding standard, for example, the block may be determined to have been encoded in direct mode by determining the value of the binary code "mb_type."

If the results of method 1400 indicate that the block is a successful candidate, then the sequence of encoded data may be changed to indicate that the block is a skipped block.

Optionally, according to some technical standards for video compression, the at least one electronic processing system may increment a value of a binary code in the sequence of encoded data. The binary code may indicate a consecutive number of blocks whose data are excluded from the sequence of encoded data. In the Advanced Video Coding standard, for example, incrementing a value of the binary code "mb_skip_run" indicates that the block is one of what may be a consecutive number of skipped blocks.

Alternatively, optionally, according to some technical standards for video compression, the at least one electronic processing system may change a value of a binary code in the sequence of encoded data. The binary code may be associated with the block and may indicate that other data associated with the block are excluded from the sequence of encoded data. In the Advanced Video Coding standard, for example, changing the value of the binary code "mb_skip_flag" indicates that the block is a skipped block.

Figure 15:
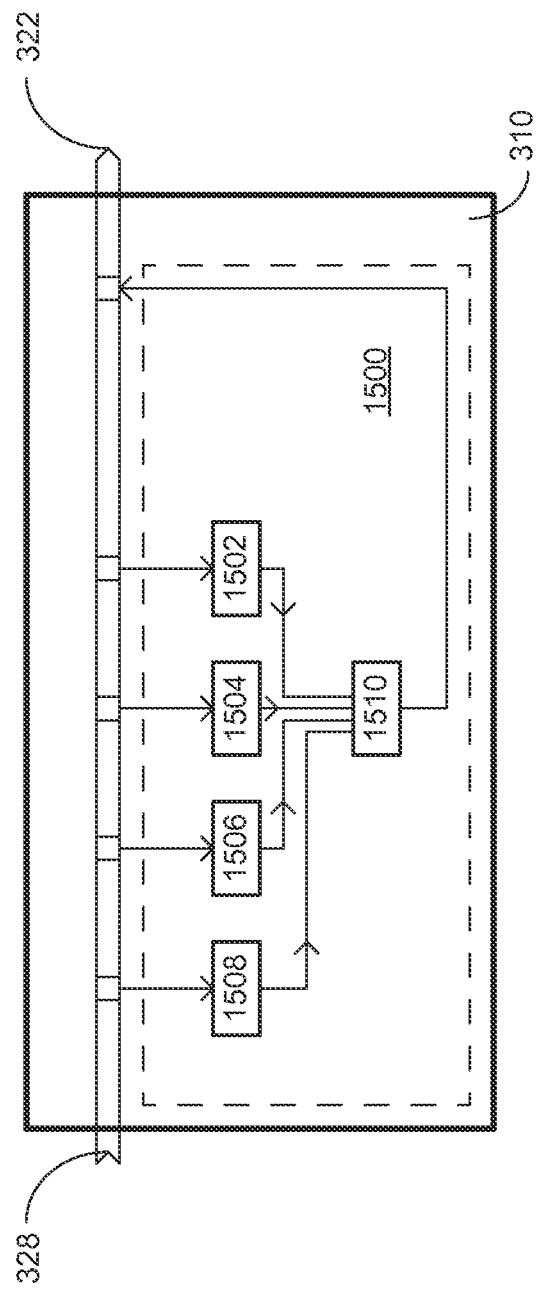

FIG. 15 is a block diagram of an example system for assessing a sequence of encoded data associated with a block of video, according to an embodiment. In FIG. 15, a system 1500 includes, for example, a first electronic processing system 1502, a second electronic processing system 1504, a third electronic processing system 1506, and a fourth electronic processing system 1508. Optionally, system 1500 may also include a fifth electronic processing system 1510. Optionally, the functions of first 1502, second 1504, third 1506, fourth 1508, and fifth 1510 electronic processing systems may be performed by a single electronic processing system.

First electronic processing system 1502 may be configured to determine if quantized coefficients of transformed residual pixel data associated with the block are equal to zero. According to some technical standards for video compression, the quantized coefficients of transformed residual pixel data associated with the block may be determined to be equal to zero by determining the value of a binary code in sequence 328 of encoded data. In the Advanced Video Coding standard, for example, the quantized coefficients of transformed residual pixel data associated with the block may be determined to be equal to zero by determining the value of the binary code "coded_block_pattern."

Second electronic processing system 1504 may be configured to determine if the block was encoded using a temporal compression process. According to some technical standards for video compression, the block may be determined to have been encoded using a temporal compression process by determining the value of a binary code in sequence 328 of encoded data. In the Advanced Video Coding standard, for example, the block may be determined to have been encoded using a temporal compression process by determining the value of the binary code "mb_type."

Third electronic processing system 1506 may be configured to determine if a slice that includes the block is configured to be encoded using two reference picture lists. Such a slice may be, for example, a B slice. The slice may be a frame. The slice may be a field. According to some technical standards for video compression, the slice that includes the block may be determined to have been configured to be encoded using two reference picture lists by determining the value of a binary code in sequence 328 of encoded data. In the Advanced Video Coding standard, for example, the slice that includes the block may be determined to have been configured to be encoded using two reference picture lists by determining the value of the binary code "slice_type."

Fourth electronic processing system 1508 may be configured to determine if the block was encoded in direct mode. According to some technical standards for video compression, the block may be determined to have been encoded in direct mode by determining the value of a binary code in sequence 328 of encoded data. In the Advanced Video Coding standard, for example, the block may be determined to have been encoded in direct mode by determining the value of the binary code "mb_type." Because according to some technical standards for video compression the same binary code that may be used to determine if the block was encoded using a temporal compression process may also be used to determine if the block was encoded in direct mode, the functions of second electronic processing system 1504 and fourth electronic processing system 1508 optionally may be performed by a single electronic processing system.

Optionally, fifth electronic processing system 1510 may be configured to determine if the block is a successful candidate for conversion to a skipped block and, if so, to change sequence 328 of encoded data to produce bitstream 322. Optionally, fifth electronic processing system 1510 may increment a value of a binary code in the sequence of encoded data. The binary code may indicate a consecutive number of blocks whose data are excluded from the sequence of encoded data. In the Advanced Video Coding standard, for example, incrementing a value of the binary code "mb_skip_run" indicates that the block is one of what may be a consecutive number of skipped blocks. Alternatively, optionally, fifth electronic processing system 1510 may change a value of a binary code in the sequence of encoded data. The binary code may be associated with the block and may indicate that other data associated with the block are excluded from the sequence of encoded data. In the Advanced Video Coding standard, for example, changing the value of the binary code "mb_skip_flag" indicates that the block is a skipped block.

Figure 16:
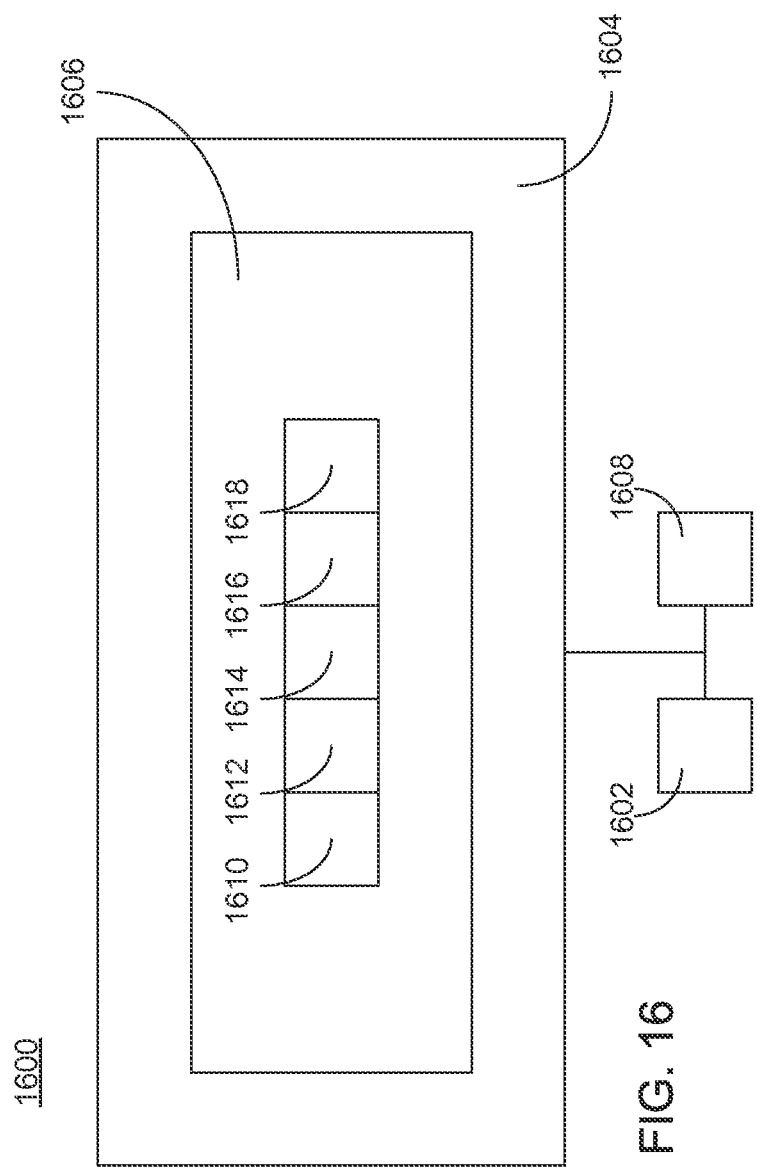

FIG. 16 is a block diagram of an example of a software or firmware embodiment of system 1500, according to an embodiment. In FIG. 16, an electronic processing system 1600 includes, for example, one or more programmable processor(s) 1602, a memory 1604, a computer program logic 1606, one or more I/O ports and/or I/O devices 1608, quantized coefficients determination logic 1610, temporal compression determination logic 1612, slice determination logic 1614, and block mode determination logic 1616. Optionally, electronic processing system 1600 also includes skipped block determination logic 1618.

One or more programmable processor(s) 1602 may be configured to execute the functionality of system 1500 as described above. Programmable processor(s) 1602 may include a central processing unit (CPU) and/or a graphics processing unit (GPU). Memory 1604 may include one or more computer readable media that may store computer program logic 1606. Memory 1604 may be implemented as a hard disk and drive, a removable media such as a compact disk, a read-only memory (ROM) or random access memory (RAM) device, for example, or some combination thereof. Programmable processor(s) 1602 and memory 1604 may be in communication using any of several technologies known to one of ordinary skill in the art, such as a bus. Computer program logic 1606 contained in memory 1604 may be read and executed by programmable processor(s) 1602. The one or more I/O ports and/or I/O devices 1608, may also be connected to processor(s) 1302 and memory 1604.

In the embodiment of FIG. 16, computer program logic 1606 may include quantized coefficients determination logic 1610, which may be configured to receive data values related to quantized coefficients of transformed residual pixel data associated with the block and to determine if they are equal to zero. Computer program logic 1606 may also include temporal compression determination logic 1312, which may be configured to receive data values related to the method of compression of the block and to determine if the block was encoded using a temporal compression process. Computer program logic 1606 may also include slice determination logic 1614, which may be configured to receive data values related to the method of compression of the slice that includes the block and to determine if the slice is configured to be encoded using two reference picture lists. Computer program logic 1606 may also include block mode determination logic 1616, which may be configured to receive data values related to the mode of the block and to determine if the block was encoded in direct mode.

Optionally, computer program logic 1606 may also include skipped block determination logic 1618, which may be configured to receive data values from quantized coefficients determination logic 1610, temporal compression determination logic 1612, slice determination logic 1614, and block mode determination logic 1616, to determine if the block is a successful candidate for conversion to a skipped block, and, if so, to send a signal to change sequence 328 of encoded data to produce bitstream 322. Optionally, skipped block determination logic 1618 may send a signal to increment a value of a binary code in the sequence of encoded data. The binary code may indicate a consecutive number of blocks whose data are excluded from the sequence of encoded data. Alternatively, optionally, skipped block determination logic 1618 may send a signal to change a value of a binary code in the sequence of encoded data. The binary code may be associated with the block and may indicate that other data associated with the block are excluded from the sequence of encoded data.

Methods 1100 and 1400 and systems 1200, 1300, 1500, and 1600 may be implemented in hardware, software, firmware, or some combination of these including, for example, second generation Intel® Core™ i processors i3/i5/i7 that include Intel® Quick Sync Video technology.

In embodiments, methods 1100 and 1400 and systems 1200, 1300, 1500, and 1600 may be implemented as part of a wired communication system, a wireless communication system, or a combination of both. In embodiments, for example, methods 1100 and 1400 and systems 1200, 1300, 1500, and 1600 may be implemented in a mobile computing device having wireless capabilities. A mobile computing device may refer to any device having an electronic processing system and a mobile power source or supply, such as one or more batteries, for example.

Examples of a mobile computing device may include a laptop computer, ultra-mobile personal computer, portable computer, handheld computer, palmtop computer, personal digital assistant (PDA), cellular telephone, combination cellular telephone/PDA, smart phone, pager, one-way pager, two-way pager, messaging device, data communication device, mobile Internet device, MP3 player, and so forth.

In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method for assessing a sequence of encoded data associated with a block of video, comprising:
    determining, via at least one electronic processing system, if quantized coefficients of transformed residual pixel data associated with the block are equal to zero;
    determining, via the at least one electronic processing system, if the block was encoded using a temporal compression process;
    determining, via the at least one electronic processing system, if a slice that includes the block is configured to be encoded using only one reference picture list;
    determining, via the at least one electronic processing system, if the block is unpartitioned;
    determining if a reference picture used to encode the block is the reference picture associated with a lowest index value on the one reference picture list; and
    determining, via the at least one electronic processing system, if an actual motion vector associated with the block is equal to a predicted motion vector associated with the block.

2. The method of claim 1, wherein the block is a macroblock.

3. The method of claim 1, wherein the slice is a frame.

4. The method of claim 1, wherein the slice is a field.

5. The method of claim 1, wherein the determining if the quantized coefficients of transformed residual pixel data associated with the block are equal to zero comprises determining a value of a binary code in the sequence of encoded data.

6. The method of claim 1, wherein the determining if the block was encoded using the temporal compression process comprises determining a value of a binary code in the sequence of encoded data.

7. The method of claim 1, wherein the determining if the slice that includes the block is configured to be encoded using only the one reference picture list comprises determining a value of a binary code in the sequence of encoded data.

8. The method of claim 1, wherein the determining if the block is unpartitioned comprises determining a value of a binary code in the sequence of encoded data.

9. The method of claim 1, further comprising:
    incrementing, via the at least one electronic processing system, a value of a binary code in the sequence of encoded data, wherein the binary code indicates a consecutive number of blocks whose data are excluded from the sequence of encoded data.

10. The method of claim 1, further comprising:
    changing, via the at least one electronic processing system, a value of a binary code in the sequence of encoded data, wherein the binary code is associated with the block and indicates that other data associated with the block are excluded from the sequence of encoded data.

11. A system for assessing a sequence of encoded data associated with a block of video, comprising:
    a first electronic processing system configured to determine if quantized coefficients of transformed residual pixel data associated with the block are equal to zero;
    a second electronic processing system configured to determine if the block was encoded using a temporal compression process;
    a third electronic processing system configured to determine if a slice that includes the block is configured to be encoded using only one reference picture list;
    a fourth electronic processing system configured to determine if the block is unpartitioned;
    a fifth electronic processing system configured to determine if a reference picture used to encode the block is the reference picture associated with a lowest index value on the one reference picture list; and
    a sixth electronic processing system configured to determine if an actual motion vector associated with the block is equal to a predicted motion vector associated with the block.

12. The system of claim 11, wherein the second electronic processing system is the fourth electronic processing system.

13. The system of claim 11, further comprising a seventh electronic processing system configured to increment a value of a binary code in the sequence of encoded data, wherein the binary code indicates a consecutive number of blocks whose data are excluded from the sequence of encoded data.

14. The system of claim 11, further comprising a seventh electronic processing system configured to change a value of a binary code in the sequence of encoded data, wherein the binary code is associated with the block and indicates that other data associated with the block are excluded from the sequence of encoded data.

15. A non-transitory machine-readable medium storing instructions which, when executed by at least one electronic processing system, cause the processing system to perform instructions for:
    determining if quantized coefficients of transformed residual pixel data associated with the block are equal to zero;
    determining if the block was encoded using a temporal compression process;
    determining if a slice that includes the block is configured to be encoded using only one reference picture list;
    determining if the block is unpartitioned;
    determining if a reference picture used to encode the block is the reference picture associated with a lowest index value on the one reference picture list; and
    determining if an actual motion vector associated with the block is equal to a predicted motion vector associated with the block.

16. A method for assessing a sequence of encoded data associated with a block of video, comprising:
    determining, via at least one electronic processing system, if quantized coefficients of transformed residual pixel data associated with the block are equal to zero;
    determining, via the at least one electronic processing system, if the block was encoded using a temporal compression process;

determining, via the at least one electronic processing system, if a slice that includes the block is configured to be encoded using two reference picture lists; and determining, via the at least one electronic processing system, if the block was encoded in direct mode.

17. The method of claim 16, wherein the block is a macroblock.

18. The method of claim 16, wherein the slice is a frame.

19. The method of claim 16, wherein the slice is a field.

20. The method of claim 16, wherein the determining if the quantized coefficients of transformed residual pixel data associated with the block are equal to zero comprises determining a value of a binary code in the sequence of encoded data.

21. The method of claim 16, wherein the determining if the block was encoded using the temporal compression process comprises determining a value of a binary code in the sequence of encoded data.

22. The method of claim 16, wherein the determining if the slice that includes the block is configured to be encoded using the two reference picture lists comprises determining a value of a binary code in the sequence of encoded data.

23. The method of claim 16, wherein the determining if the block was encoded in direct mode comprises determining a value of a binary code in the sequence of encoded data.

24. The method of claim 16, further comprising:
incrementing, via the at least one electronic processing system, a value of a binary code in the sequence of encoded data, wherein the binary code indicates a consecutive number of blocks whose data are excluded from the sequence of encoded data.

25. The method of claim 16, further comprising:
changing, via the at least one electronic processing system, a value of a binary code in the sequence of encoded data, wherein the binary code is associated with the block and indicates that other data associated with the block are excluded from the sequence of encoded data.

26. A system for assessing a sequence of encoded data associated with a block of video, comprising:

a first electronic processing system configured to determine if quantized coefficients of transformed residual pixel data associated with the block are equal to zero;

a second electronic processing system configured to determine if the block was encoded using a temporal compression process;

a third electronic processing system configured to determine if a slice that includes the block is configured to be encoded using two reference picture lists; and a fourth electronic processing system configured to determine if the block was encoded in direct mode.

27. The system of claim 26, wherein the second electronic processing system is the fourth electronic processing system.

28. The system of claim 26, further comprising a fifth electronic processing system configured to increment a value of a binary code in the sequence of encoded data, wherein the binary code indicates a consecutive number of blocks whose data are excluded from the sequence of encoded data.

29. The system of claim 26, further comprising a fifth electronic processing system configured to change a value of a binary code in the sequence of encoded data, wherein the binary code is associated with the block and indicates that other data associated with the block are excluded from the sequence of encoded data.

30. A non-transitory machine-readable medium storing instructions which, when executed by at least one electronic processing system, cause the processing system to perform instructions for:

determining if quantized coefficients of transformed residual pixel data associated with the block are equal to zero;

determining if the block was encoded using a temporal compression process;

determining if a slice that includes the block is configured to be encoded using two reference picture lists; and determining if the block was encoded in direct mode.

* * * * *